US010636126B2

(12) United States Patent
Kajimura

(10) Patent No.: US 10,636,126 B2
(45) Date of Patent: Apr. 28, 2020

(54) IMAGE PROCESSING DEVICE, IMAGING APPARATUS, IMAGE PROCESSING METHOD, IMAGE PROCESSING PROGRAM, AND RECORDING MEDIUM

(71) Applicant: OLYMPUS CORPORATION, Hachioji-shi, Tokyo (JP)

(72) Inventor: Kosuke Kajimura, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 147 days.

(21) Appl. No.: 15/946,255

(22) Filed: Apr. 5, 2018

(65) Prior Publication Data
US 2018/0225810 A1 Aug. 9, 2018

Related U.S. Application Data

(63) Continuation of application No. PCT/JP2015/079295, filed on Oct. 16, 2015.

(51) Int. Cl.
G06T 5/00 (2006.01)
G06T 3/40 (2006.01)
(Continued)

(52) U.S. Cl.
CPC ............ G06T 5/003 (2013.01); G06T 3/4015 (2013.01); G06T 3/4053 (2013.01);
(Continued)

(58) Field of Classification Search
CPC .. G06T 5/003; G06T 5/50; G06T 7/32; G06T 7/248; G06T 3/4015; G06T 3/4053; G06T 3/4069; H04N 9/04551; H04N 5/23232
See application file for complete search history.

(56) References Cited

U.S. PATENT DOCUMENTS 6,429,895 B1 8/2002 Onuki
2002/0097324 A1 7/2002 Onuki
(Continued)

FOREIGN PATENT DOCUMENTS

JP 10191136 A 7/1998
JP 2011199786 A 10/2011
(Continued)

OTHER PUBLICATIONS

International Search Report (ISR) dated Nov. 24, 2015 issued in International Application No. PCT/JP2015/079295.
Written Opinion dated Nov. 24, 2015 issued in International Application No. PCT/JP2015/079295.

Primary Examiner — Leon Flores
(74) Attorney, Agent, or Firm — Holtz, Holtz & Volek PC

(57) ABSTRACT

An image processing device includes: a high-resolution combining unit that generates a high-resolution combined image by combining a standard image with at least one reference image other than the standard image in a high-resolution image space having higher resolution than the standard image or the at least one reference image, the standard image and the at least one reference image being acquired by photographing a subject in a time-series manner by using an imaging element having a plurality of types of color filters arranged for each pixel; a moving-object detecting unit that determines at least one correlation amount by calculating a magnitude relationship between a plurality of correlation values within an arbitrary region of the high-resolution combined image generated by the high-resolution combining unit; and an image correcting unit that corrects the high-resolution combined image based on the correlation amount determined by the moving-object detecting unit.

12 Claims, 27 Drawing Sheets

(51) Int. Cl.
  *H04N 5/232* (2006.01)
  *H04N 9/04* (2006.01)
  *G06T 7/32* (2017.01)
  *G06T 7/246* (2017.01)
  *G06T 5/50* (2006.01)

(52) U.S. Cl.
  CPC .............. *G06T 3/4069* (2013.01); *G06T 5/50* (2013.01); *G06T 7/248* (2017.01); *G06T 7/32* (2017.01); *H04N 5/23232* (2013.01); *H04N 9/04551* (2018.08); *G06T 2207/10016* (2013.01); *G06T 2207/10024* (2013.01); *G06T 2207/20201* (2013.01)

(56) References Cited

U.S. PATENT DOCUMENTS

| | | | |
|---|---|---|---|
| 2005/0025388 A1* | 2/2005 | Damera-Venkata | ......................... G09G 3/007 382/300 |
| 2010/0128928 A1* | 5/2010 | Ishiwatari | ............. G06T 3/4053 382/103 |
| 2012/0269444 A1 | 10/2012 | Naito | |

FOREIGN PATENT DOCUMENTS

| | | |
|---|---|---|
| JP | 2012230486 A | 11/2012 |
| JP | 2015076796 A | 4/2015 |
| WO | 2015053080 A1 | 4/2015 |

\* cited by examiner

FIG. 2A

Gr CHANNEL

| Gr4 | | Gr3 | | Gr4 | | Gr3 | |
|---|---|---|---|---|---|---|---|
| | Gr8 | | Gr7 | | Gr8 | | Gr7 |
| Gr2 | | Gr1 | | Gr2 | | Gr1 | |
| | Gr6 | | Gr5 | | Gr6 | | Gr5 |
| Gr4 | | Gr3 | | Gr4 | | Gr3 | |
| | Gr8 | | Gr7 | | Gr8 | | Gr7 |
| Gr2 | | Gr1 | | Gr2 | | Gr1 | |
| | Gr6 | | Gr5 | | Gr6 | | Gr5 |

FIG. 2B

Gb CHANNEL

| Gb1 | | Gb2 | | Gb1 | | Gb2 | |
|---|---|---|---|---|---|---|---|
| | Gb5 | | Gb6 | | Gb5 | | Gb6 |
| Gb3 | | Gb4 | | Gb3 | | Gb4 | |
| | Gb7 | | Gb8 | | Gb7 | | Gb8 |
| Gb1 | | Gb2 | | Gb1 | | Gb2 | |
| | Gb5 | | Gb6 | | Gb5 | | Gb6 |
| Gb3 | | Gb4 | | Gb3 | | Gb4 | |
| | Gb7 | | Gb8 | | Gb7 | | Gb8 |

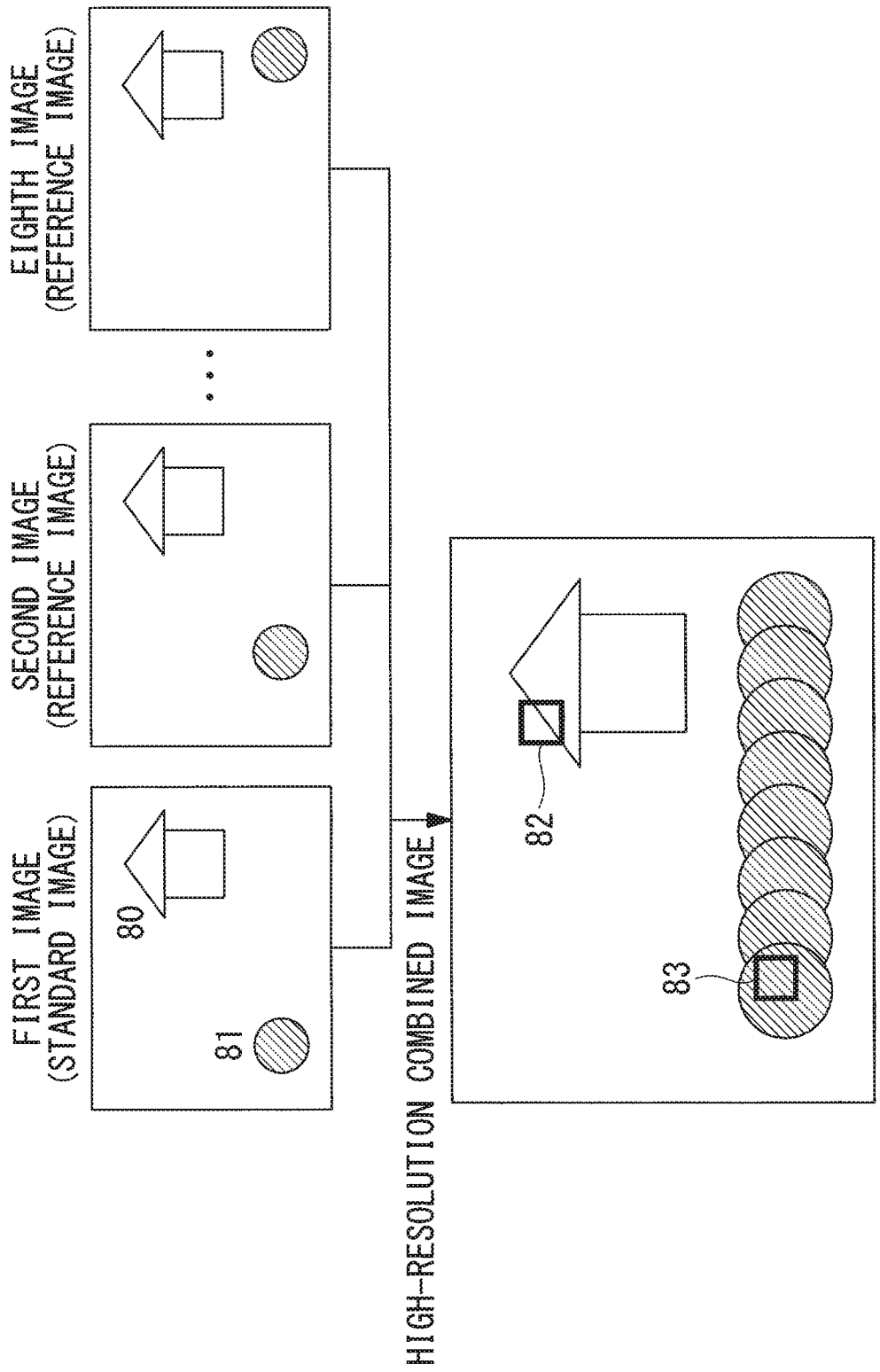

FIG. 9A

Gb CHANNEL

| 16 |    | 15 |    | 26 |    | 30 |    |
|    | 33 |    | 33 |    | 30 |    | 40 |
| 17 |    | 26 |    | 23 |    | 60 |    |
|    | 28 |    | 40 |    | 55 |    | 55 |
| 30 |    | 35 |    | 35 |    | 60 |    |
|    | 33 |    | 38 |    | 40 |    | 68 |
| 35 |    | 30 |    | 73 |    | 60 |    |
|    | 45 |    | 90 |    | 55 |    | 70 |

301

| 0 | 8  | 0 | 16 |
| 8 | 0  | 11| 0  |
| 0 | 11 | 0 | 10 |
| 9 | 0  | 9 | 0  |

SAD0=82

Gr CHANNEL

| 16 |    | 15 |    | 26 |    | 30 |    |
|    | 30 |    | 28 |    | 30 |    | 40 |
| 20 |    | 35 |    | 32 |    | 60 |    |
|    | 30 |    | 29 |    | 45 |    | 55 |
| 30 |    | 27 |    | 24 |    | 50 |    |
|    | 31 |    | 30 |    | 56 |    | 65 |
| 30 |    | 30 |    | 70 |    | 55 |    |
|    | 45 |    | 90 |    | 54 |    | 65 |

Gr CHANNEL

| 16 | | 20 | | 30 | | 30 | | 45 | |
| | 30 | | 30 | | 30 | | 90 | | 65 |
| 15 | | 35 | | 27 | | 30 | | 54 | |
| | 28 | | 29 | | 24 | | 70 | | 55 |
| 26 | | 32 | | 45 | | 56 | | 55 | |
| | 30 | | 60 | | 50 | | 55 | | 65 |
| 30 | | 40 | | | | | | | |

300

Gb CHANNEL

| 16 | | 17 | | 28 | | 35 | | 45 | |
| | 33 | | 26 | | 30 | | 73 | | 70 |
| 15 | | 33 | | 40 | | 38 | | 90 | |
| | 23 | | 35 | | 55 | | 60 | | 55 |
| 26 | | 60 | | 55 | | 40 | | 68 | |
| 30 | | 30 | | 40 | | 60 | | | |

302

| 19 | 0 | 10 | 0 |
| 0 | 0 | 0 | 2 |
| 17 | 4 | 0 | 0 |
| 0 | 0 | 2 | 16 |
| 0 | 12 | | |

SAD1=82

Gb CHANNEL

| | 30 | | 50 | | 50 | | 50 |
|---|---|---|---|---|---|---|---|
| 48 | | 30 | | 50 | | 55 | |
| | 30 | | 35 | | 44 | | 45 |
| 30 | | 35 | | 30 | | 50 | |
| | 31 | | 50 | | 50 | | 40 |
| 30 | | 48 | | 48 | | 55 | |
| | 30 | | 45 | | 30 | | 40 |
| 33 | | 30 | | 30 | | 30 | |

(box labeled 301)

Gr CHANNEL

| | 30 | | 50 | | 50 | | 40 |
|---|---|---|---|---|---|---|---|
| 30 | | 30 | | 55 | | 50 | |
| | 31 | | 33 | | 48 | | 40 |
| 30 | | 30 | | 45 | | 48 | |
| | 30 | | 30 | | 45 | | 40 |
| 35 | | 30 | | 30 | | 57 | |
| | 50 | | 28 | | 30 | | 40 |
| 46 | | 48 | | 30 | | 30 | |

(box labeled 300)

| 13 | 0 | 5 | 0 |
|---|---|---|---|
| 0 | 20 | 0 | 2 |
| 18 | 0 | 15 | 0 |
| 0 | 5 | 0 | 4 |

SAD0=82

IMAGE PROCESSING DEVICE, IMAGING APPARATUS, IMAGE PROCESSING METHOD, IMAGE PROCESSING PROGRAM, AND RECORDING MEDIUM

CROSS-REFERENCE TO RELATED APPLICATIONS

This is a continuation of International Application PCT/JP2015/079295 which is hereby incorporated by reference herein in its entirety.

TECHNICAL FIELD

The present invention relates to image processing devices, imaging apparatuses, image processing methods, image processing programs, and recording media.

BACKGROUND ART

One of the known technologies for combining a plurality of images to obtain a high-resolution image is a pixel-shift super-resolution technology that achieves improved resolution by combining images photographed by relatively displacing the positions of an optical image and an imaging system. Specifically, the plurality of images photographed by relatively displacing the positions of the optical image and the imaging system are arranged while taking into account the amount of displacement in an image space having higher resolution than the photographed images, and the resolution is improved by performing an interpolation process, a repetitive reconfiguration process, and so on based on the image information. This technology is advantageous in that the resolution can be improved since aliasing (moiré) is removed as a result of combining a plurality of positionally-displaced images with respect to a subject that may cause aliasing to occur in a photographed image, such as a subject with a fine pattern.

However, the above-described technology is problematic in that artifacts, such as a ghost image, may occur in a region that involves movement of the subject. A technology disclosed in Patent Literature 1 is known for reducing such artifacts in a moving-object region.

In Patent Literature 1, a correlation amount is calculated between a plurality of images, and a combining ratio of the images is controlled based on the correlation amount. For example, of the plurality of photographed images, one image is set as a standard image and another image is set as a reference image. A difference between the standard image and the reference image is determined for each region, and a correlation amount relative to the standard image is calculated from the difference value. Control is performed such that the combining ratio of the reference image increases with increasing correlation and the combining ratio of the reference image decreases (i.e., the ratio of the standard image increases) with decreasing correlation. Accordingly, artifacts, such as a ghost image, caused by movement of the subject or by positional displacement are prevented from occurring.

CITATION LIST

Patent Literature

{PTL 1}
Japanese Unexamined Patent Application, Publication No. 2011-199786

SUMMARY OF INVENTION

According to an aspect of the present invention, an image processing device includes a high-resolution combining unit, a moving-object detecting unit, and an image correcting unit. The high-resolution combining unit generates a high-resolution combined image by combining a standard image with at least one reference image other than the standard image in a high-resolution image space having higher resolution than the standard image or the at least one reference image. The standard image and the at least one reference image are acquired by photographing a subject in a time-series manner by using an imaging element having a plurality of types of color filters arranged for each pixel. The moving-object detecting unit determines at least one correlation amount by calculating a magnitude relationship between a plurality of correlation values within an arbitrary region of the high-resolution combined image generated by the high-resolution combining unit. The image correcting unit corrects the high-resolution combined image based on the correlation amount determined by the moving-object detecting unit.

According to another aspect of the present invention, an image processing method includes: a high-resolution combining step for generating a high-resolution combined image by combining a standard image with at least one reference image other than the standard image in a high-resolution image space having higher resolution than the standard image or the at least one reference image, the standard image and the at least one reference image being acquired by photographing a subject in a time-series manner by using an imaging element having a plurality of types of color filters arranged for each pixel; a moving-object detecting step for determining at least one correlation amount by calculating a magnitude relationship between a plurality of correlation values within an arbitrary region of the high-resolution combined image generated in the high-resolution combining step; and an image correcting step for correcting the high-resolution combined image based on the correlation amount determined in the moving-object detecting step.

Another aspect of the present invention provides an image processing program causing a computer to execute a process, the process including: a high-resolution combining step for generating a high-resolution combined image by combining a standard image with at least one reference image other than the standard image in a high-resolution image space having higher resolution than the standard image or the at least one reference image, the standard image and the at least one reference image being acquired by photographing a subject in a time-series manner by using an imaging element having a plurality of types of color filters arranged for each pixel; a moving-object detecting step for determining at least one correlation amount by calculating a magnitude relationship between a plurality of correlation values within an arbitrary region of the high-resolution combined image generated in the high-resolution combining step; and an image correcting step for correcting the high-resolution combined image based on the correlation amount determined in the moving-object detecting step.

Another aspect of the present invention provides a non-transitory computer readable recording medium storing an image processing program causing a computer to execute a process, the process including: a high-resolution combining step for generating a high-resolution combined image by combining a standard image with at least one reference image other than the standard image in a high-resolution image space having higher resolution than the standard image or the at least one reference image, the standard image and the at least one reference image being acquired by photographing a subject in a time-series manner by using an imaging element having a plurality of types of color filters arranged for each pixel; a moving-object detecting step for determining at least one correlation amount by calculating a magnitude relationship between a plurality of correlation values within an arbitrary region of the high-resolution combined image generated in the high-resolution combining step; and an image correcting step for correcting the high-resolution combined image based on the correlation amount determined in the moving-object detecting step.

BRIEF DESCRIPTION OF DRAWINGS

FIG. 2A illustrates a part of a Gr-channel high-resolution image acquired by the imaging apparatus in FIG. 1.

FIG. 2B illustrates a part of a Gb-channel high-resolution image acquired by the imaging apparatus in FIG. 1.

FIG. 8 illustrates a specific operation example of an image processing device included in the imaging apparatus in FIG. 1.

Figure 9D:
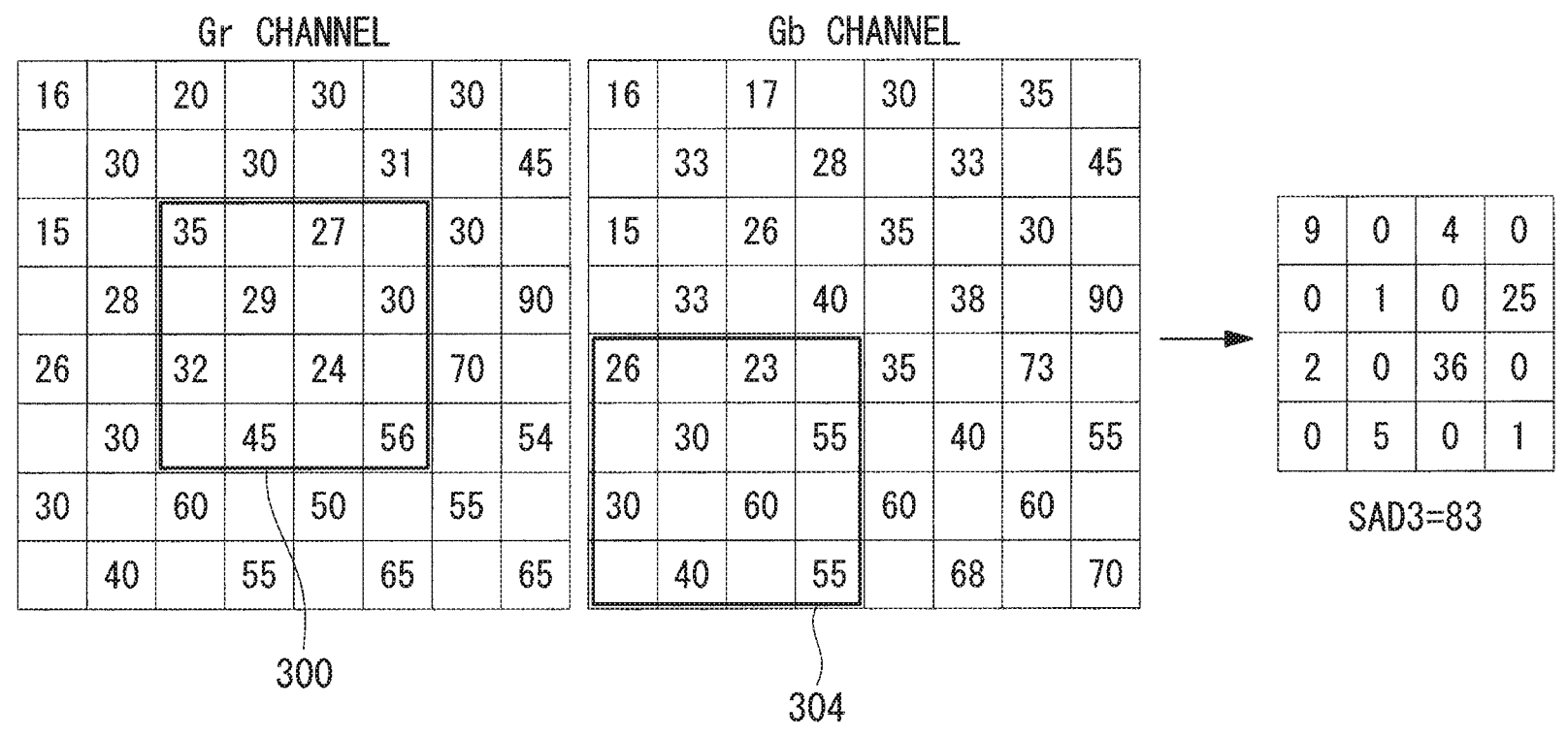

FIG. 9A illustrates a correlation-value calculation example having a specific example of pixel values in FIG. 3A with respect to a non-moving-object region in FIG. 8.

FIG. 9B illustrates a correlation-value calculation example having a specific example of pixel values in FIG. 3B with respect to the non-moving-object region in FIG. 8.

FIG. 9D illustrates a correlation-value calculation example having a specific example of pixel values in FIG. 3D with respect to the non-moving-object region in FIG. 8.

Figure 10D:
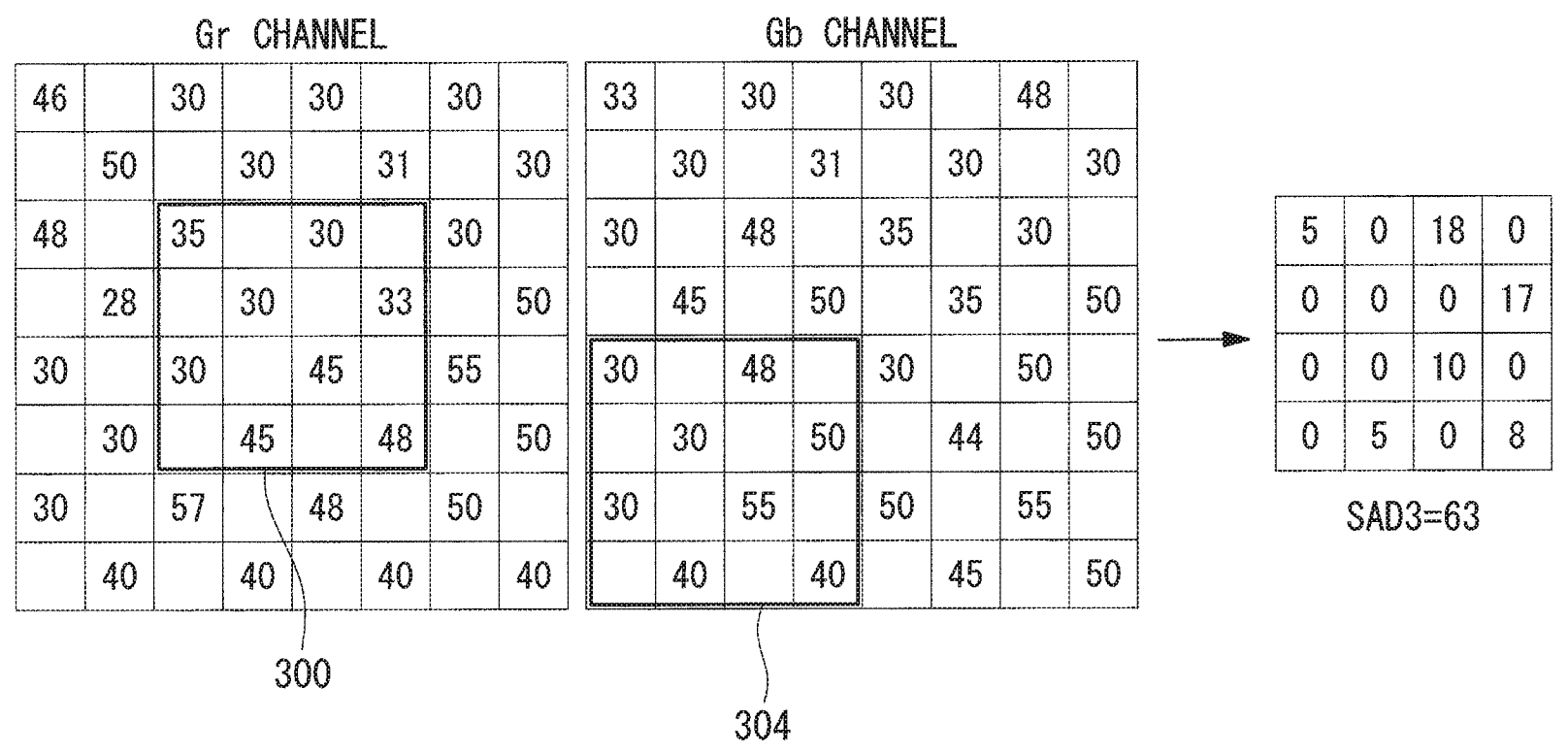
Figure 10E:
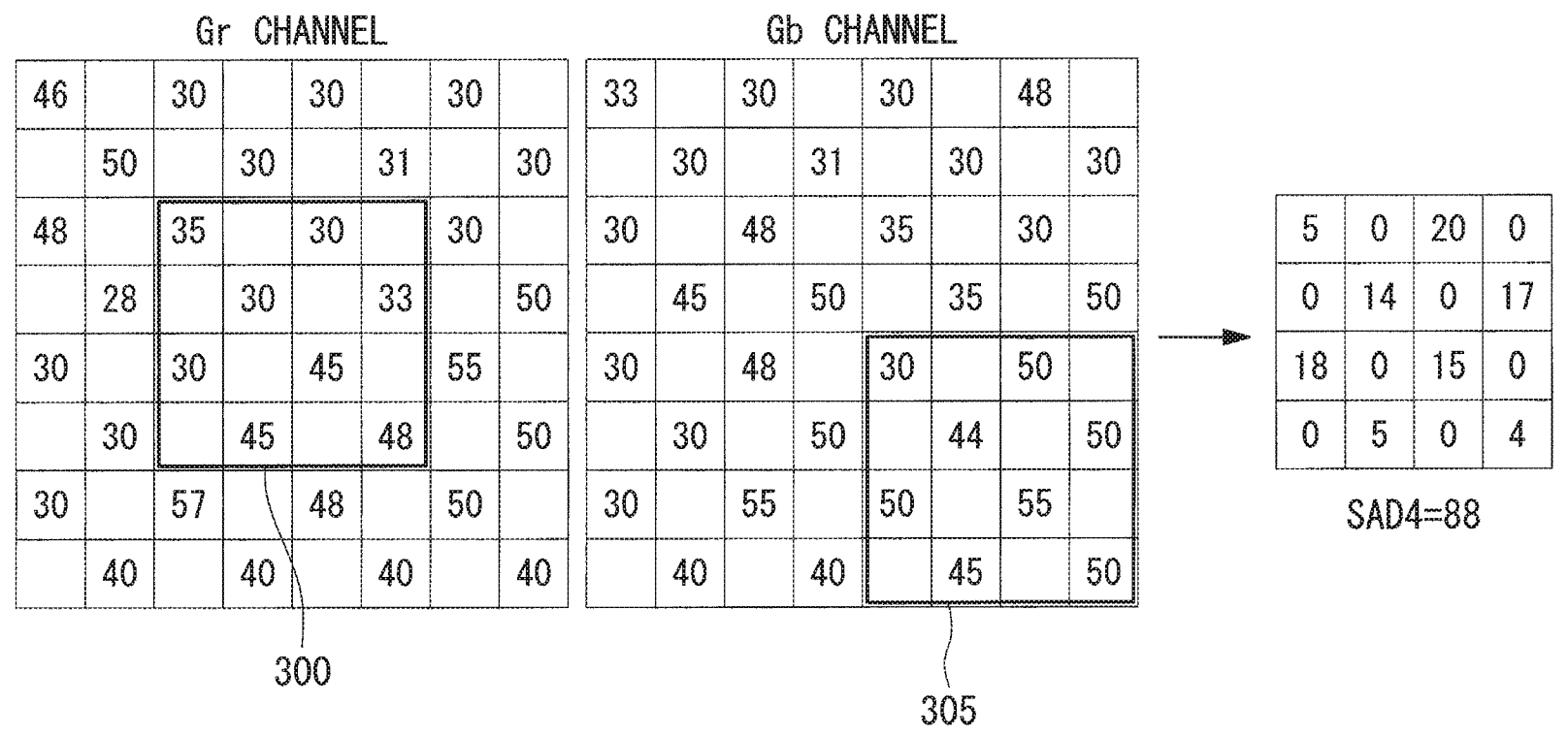

FIG. 10A illustrates a correlation-value calculation example having a specific example of pixel values in FIG. 3A with respect to a moving-object region in FIG. 8.

FIG. 10D illustrates a correlation-value calculation example having a specific example of pixel values in FIG. 3D with respect to the moving-object region in FIG. 8.

FIG. 10E illustrates a correlation-value calculation example having a specific example of pixel values in FIG. 3E with respect to the moving-object region in FIG. 8.

DESCRIPTION OF EMBODIMENTS

An imaging apparatus 1 and an image processing device 3 according to an embodiment of the present invention will be described below with reference to the drawings.

Figure 1:
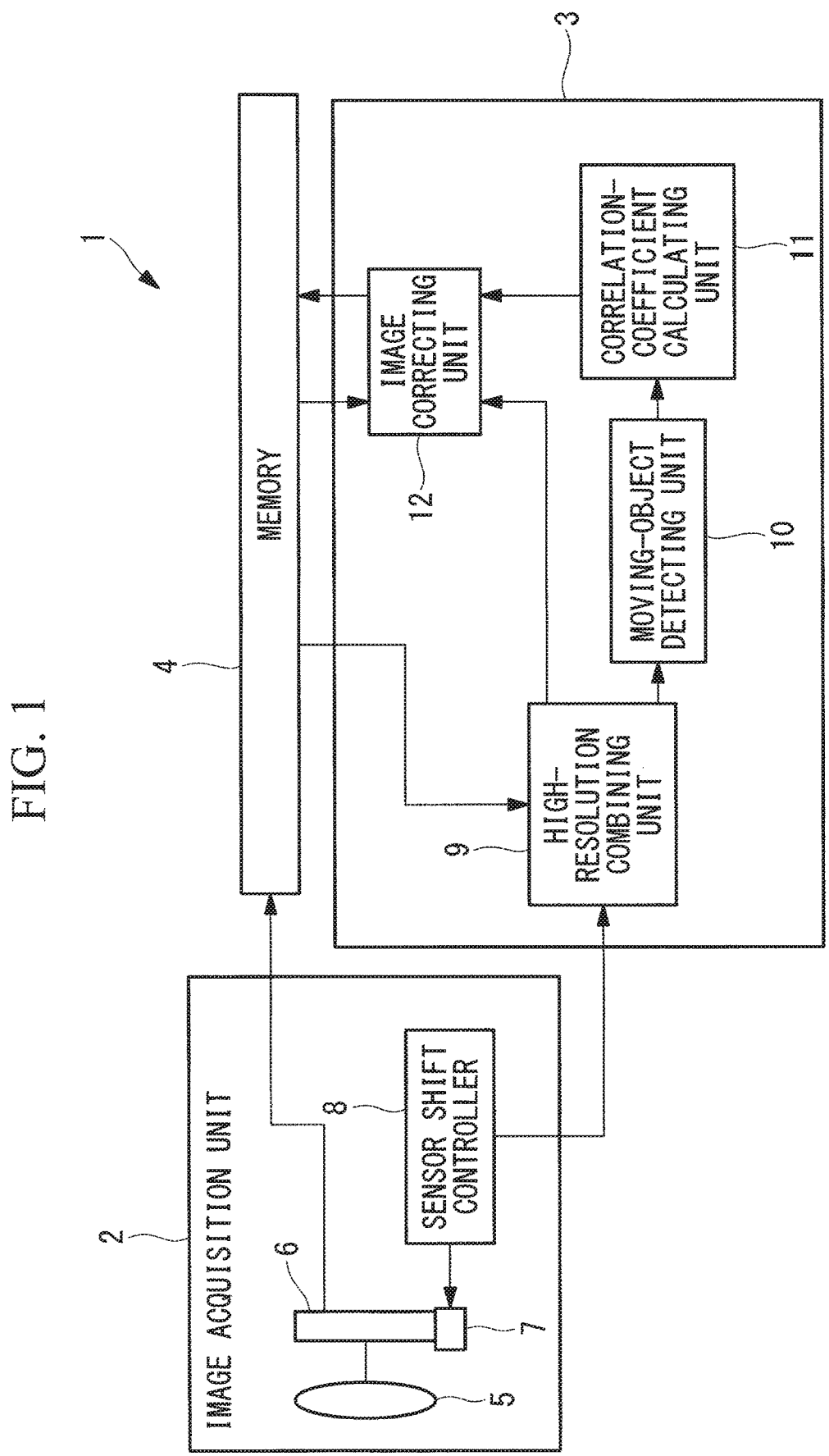
FIG. 1 illustrates the overall configuration of an imaging apparatus according to an embodiment of the present invention.

As shown in FIG. 1, the imaging apparatus 1 according to this embodiment includes an image acquisition unit 2 that photographs a subject so as to acquire an image thereof, a memory 4 that stores the image acquired by the image acquisition unit 2, and the image processing device 3 according to the embodiment of the present invention that processes the image stored in the memory 4.

The image acquisition unit 2 includes an imaging lens 5 that focuses light from the subject, an imaging element 6 that receives the light focused by the imaging lens 5 and forms an optical image of the subject, a sensor shifting mechanism 7 that shifts the imaging element 6 in units of subpixels in pixel array directions, and a sensor shift controller 8 that controls the direction in which the imaging element 6 is shifted and the amount by which the imaging element 6 is shifted by the sensor shifting mechanism 7.

The imaging element 6 has a so-called Bayer pattern structure in which four types of color filters for R, Gr, Gb, and B colors are arranged for respective pixels in units of 2×2 pixels. With regard to a plurality of images acquired in a time-series manner by the imaging element 6, the first-acquired image is stored as a standard image and at least one image subsequently acquired by shifting the imaging element 6 is stored as a reference image in the memory 4.

The image processing device 3 includes a high-resolution combining unit 9 that generates a high-resolution combined image from the plurality of images stored in the memory 4, a moving-object detecting unit 10 that calculates a plurality of correlation values from the combined image and calculates at least one correlation amount by calculating the magnitude relationship between the plurality of calculated correlation values, a correlation-coefficient calculating unit 11 that converts the correlation amount calculated by the moving-object detecting unit 10 into a correlation coefficient to be used for image correction, and an image correcting unit 12 that corrects the combined image based on the calculated correlation coefficient.

The high-resolution combining unit 9 receives the plurality of images from the memory 4 and also receives shift control information (i.e., the shift direction and the shift amount) of the imaging element 6 from the sensor shift controller 8. The high-resolution combining unit 9 arranges the standard image and the at least one reference image received from the memory 4 in a high-resolution image space for each of the colors of the color filters while positioning the standard image and the at least one reference image based on the shift control information received from the sensor shift controller 8.

Specifically, the pixels of the standard image are arranged in the high-resolution image space for each of the colors of the color filters, and the pixels of the reference image are subsequently arranged in the high-resolution image space based on the shift direction and the shift amount relative to the standard image. When arranging the pixels, if pixels of the same color as the color of the color filter corresponding to the pixels to be arranged are already arranged on the pixels of the standard image or the pixels of another reference image, the pixels do not have to be newly arranged or the pixel values may be updated by averaging out the pixels to be arranged and the already-arranged pixels. Alternatively, normalization may be performed based on the number of additions after performing cumulative addition.

After all of the pixels are arranged, the high-resolution combining unit 9 may perform a filling process by interpolating pixels that are not arranged yet. The interpolation method may involve, for example, performing a filling step in accordance with a nearest neighbor method by using neighboring pixels or performing direction detection interpolation in view of the edge direction.

FIG. 2A illustrates a combined image of the Gr channel in the high-resolution image space, and FIG. 2B illustrates a combined image of the Gb channel in the high-resolution image space. Combined images of the R and B channels are generated in the same manner.

In the examples shown in FIGS. 2A and 2B, a combined image is generated by combining a total of eight images, namely, one standard image and seven reference images. The suffixes in the drawings indicate the order in which the images are photographed. Assuming that the left-right direction is the horizontal direction and the up-down direction is the vertical direction as the pixel array directions, the pixels in each of FIGS. 2A and 2B are pixels that constitute an image acquired as follows:

1: standard image;
2: shifting the image in the horizontal direction by one pixel and in the vertical direction by zero pixels relative to the standard image;
3: shifting the image in the horizontal direction by zero pixels and in the vertical direction by one pixel relative to the standard image;
4: shifting the image in the horizontal direction by one pixel and in the vertical direction by one pixel relative to the standard image;
5: shifting the image in the horizontal direction by 0.5 pixels and in the vertical direction by 0.5 pixels relative to the standard image;
6: shifting the image in the horizontal direction by 1.5 pixels and in the vertical direction by 0.5 pixels relative to the standard image;
7: shifting the image in the horizontal direction by 0.5 pixels and in the vertical direction by 1.5 pixels relative to the standard image; and
8: shifting the image in the horizontal direction by 1.5 pixels and in the vertical direction by 1.5 pixels relative to the standard image.

When pixels doubled in number are arranged both in the horizontal direction and the vertical direction in the high-resolution image space in view of the shift direction and the shift amount of each image, the results shown in FIGS. 2A and 2B are obtained. The shaded sections in the drawings indicate non-arranged pixels.

The moving-object detecting unit 10 divides the combined image of the Gr channel and the combined image of the Gb channel into small regions and performs correlation calculation on each of the corresponding small regions. In this case, an SAD (sum of absolute difference) value is calculated as a correlation value for each corresponding small region, and two correlation amounts indicating the degree of edge and the degree of moving object are determined by calculating the magnitude relationship using the obtained result.

Figure 3A:
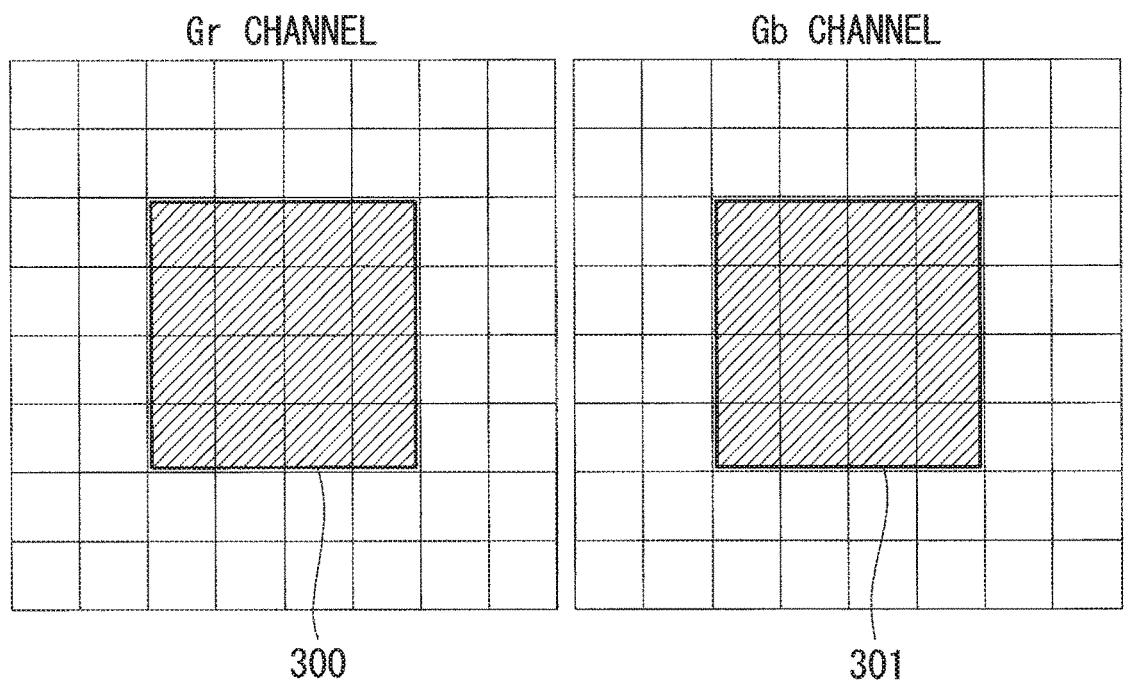
FIG. 3A illustrates calculation regions defined in regions of interest at identical positions between the Gr channel in FIG. 2A and the Gb channel in FIG. 2B.
Figure 3B:
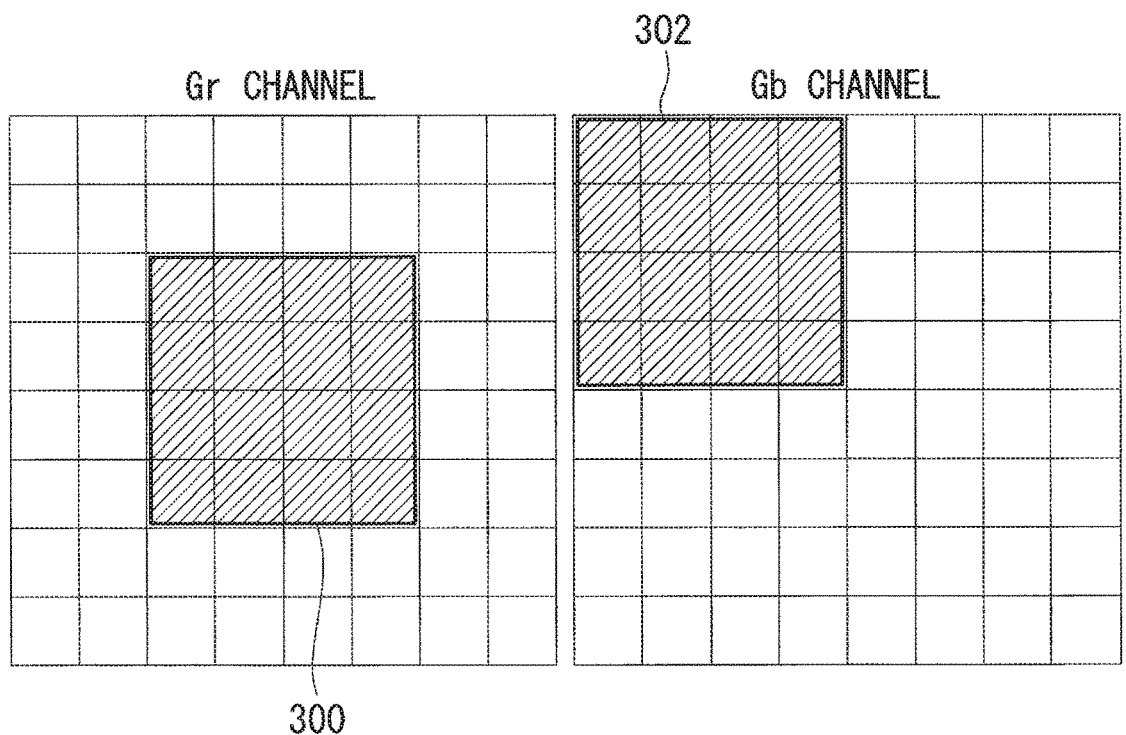
FIG. 3B illustrates a state where the calculation region of the Gb channel in FIG. 2B is shifted toward the upper left side relative to the calculation region of the Gr channel in FIG. 2A.
Figure 3C:
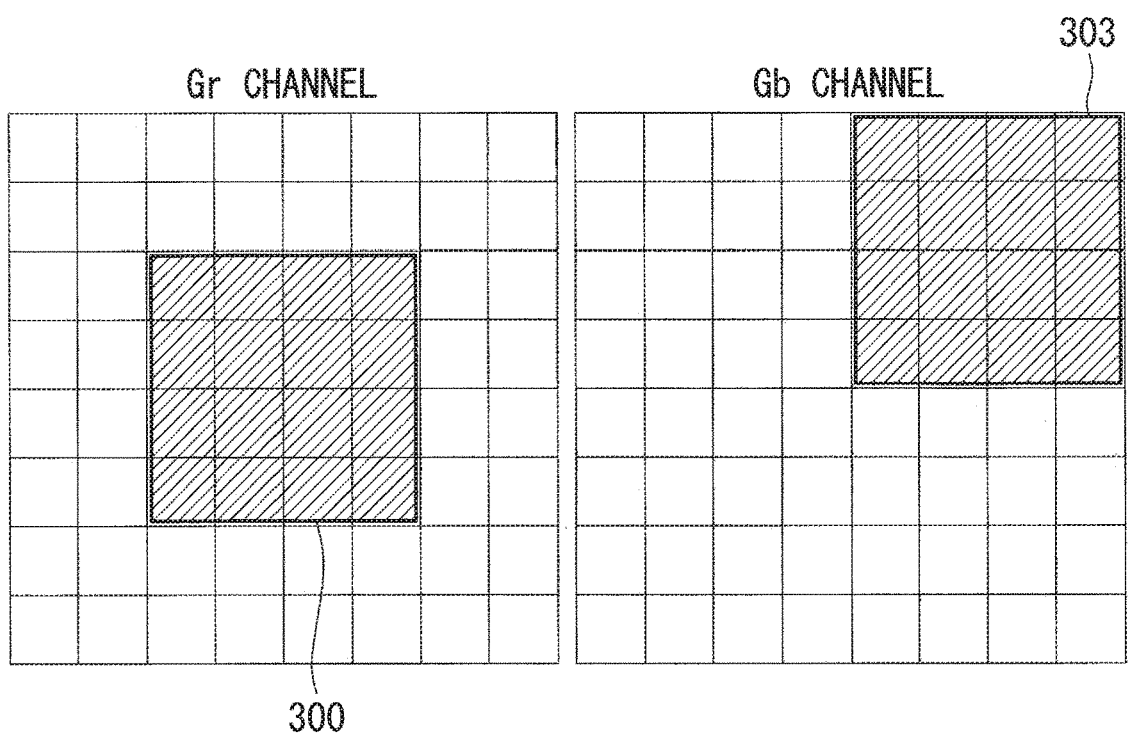
FIG. 3C illustrates a state where the calculation region of the Gb channel in FIG. 2B is shifted toward the upper right side relative to the calculation region of the Gr channel in FIG. 2A.
Figure 3D:
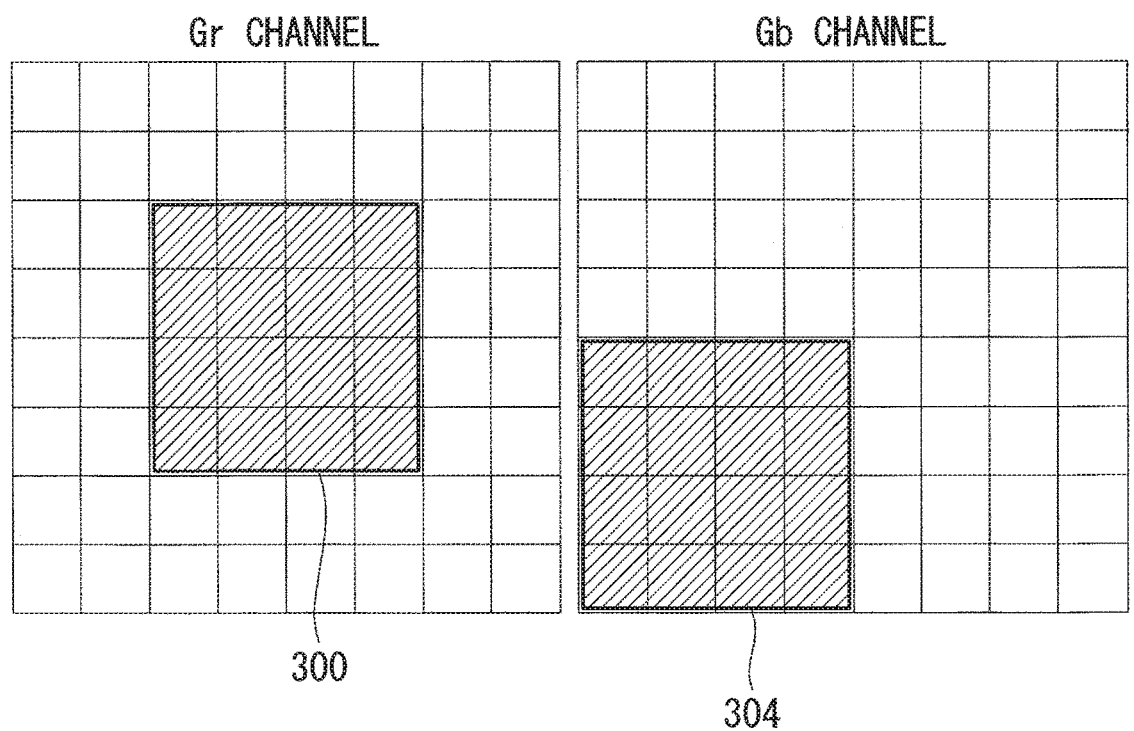
FIG. 3D illustrates a state where the calculation region of the Gb channel in FIG. 2B is shifted toward the lower left side relative to the calculation region of the Gr channel in FIG. 2A.
Figure 3E:
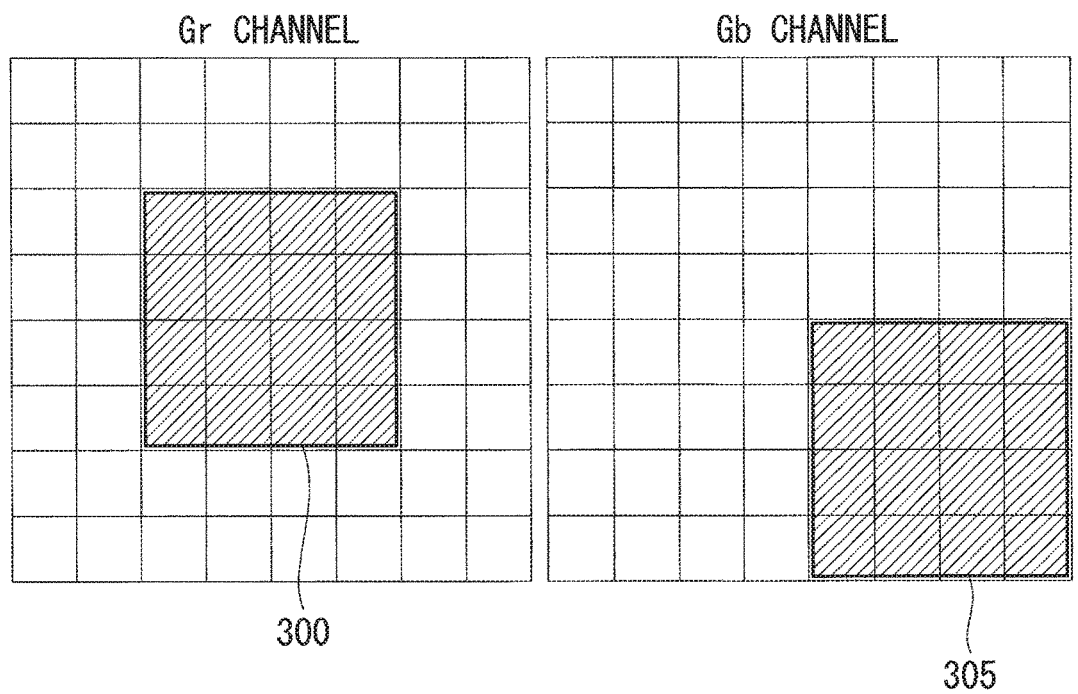
FIG. 3E illustrates a state where the calculation region of the Gb channel in FIG. 2B is shifted toward the lower right side relative to the calculation region of the Gr channel in FIG. 2A.

In detail, as shown in FIG. 3A, eight images are arranged in the high-resolution image space and are interpolated. Accordingly, by using a combined image in which all of the pixels have pixel values, an 8×8-pixel small region located at the same position between the combined image of the Gr channel and the combined image of the Gb channel is set as a region of interest.

Furthermore, 4×4 pixels within the region of interest are set as a calculation region to be used in correlation calculation. This calculation region is set in each of the combined image of the Gr channel and the combined image of the Gb channel. As shown in FIG. 3A, one of the calculation regions is set as a 4×4-pixel calculation region located at the same position between the Gr channel and the Gb channel. Moreover, as shown in FIGS. 3B to 3E, four other calculation regions are set such that the calculation region in the combined image of the Gr channel and the calculation region in the combined image of the Gb channel are displaced from each other by two pixels in the horizontal direction and the vertical direction.

Then, an SAD value (referred to as an SAD0 value hereinafter) of a calculation region 300 and a calculation region 301, an SAD value (SAD1 value) of the calculation region 300 and a calculation region 302, an SAD value (SAD2 value) of the calculation region 300 and a calculation region 303, an SAD value (SAD3 value) of the calculation region 300 and a calculation region 304, and an SAD value (SAD4 value) of the calculation region 300 and a calculation region 305 are calculated.

Furthermore, a maximum value (MaxSAD) and a minimum value (MinSAD) are determined from the calculated SAD0 to SAD4 values.

By using these values, a correlation amount (i.e., a first correlation amount) indicating the degree of edge of the region of interest and a correlation amount (i.e., a second correlation amount) indicating the degree of moving object are calculated in accordance with the following magnitude-relationship arithmetic expression.

First Correlation Amount=MaxSAD−SAD0

Second Correlation Amount=SAD0−MinSAD

The first correlation amount increases with increasing degree of edge. The second correlation amount increases with increasing degree of moving object.

Figure 4:
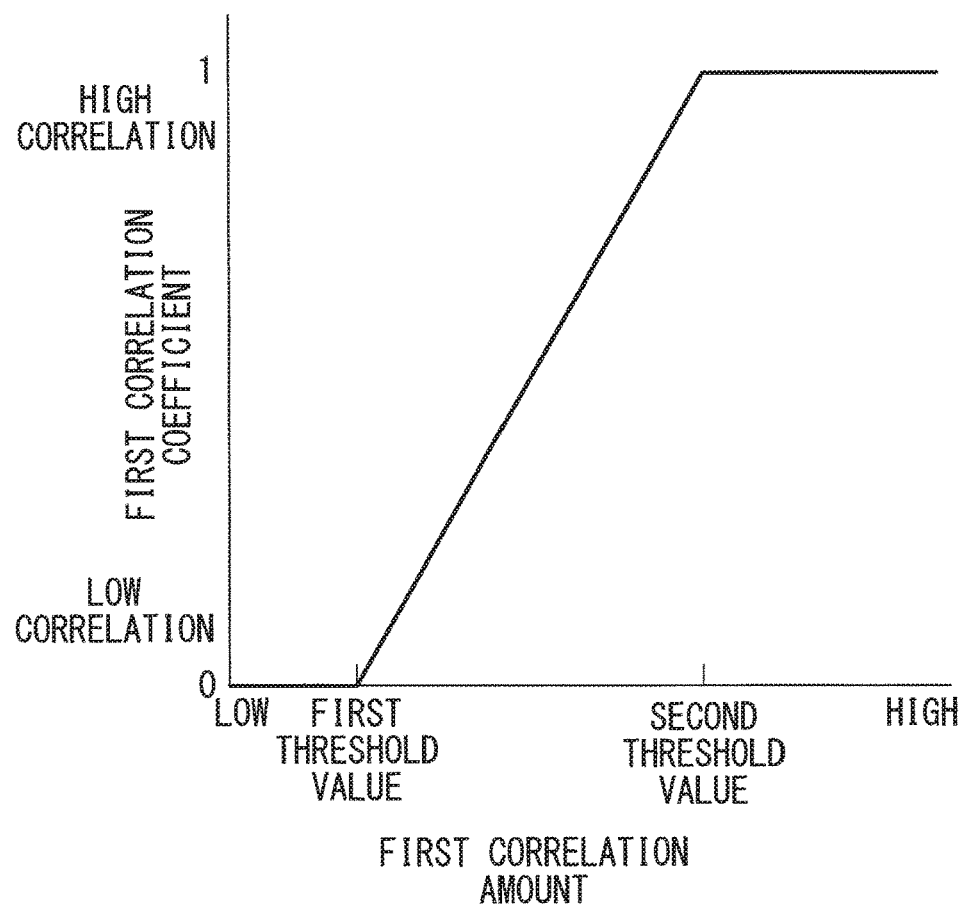
FIG. 4 illustrates an example of a map used by a correlation-coefficient calculating unit of the imaging apparatus in FIG. 1 for calculating a first correlation coefficient from a first correlation amount.

In the correlation-coefficient calculating unit 11, the two correlation amounts determined by the moving-object detecting unit 10 are respectively converted into a first correlation coefficient and a second correlation coefficient to be used in image correction. For example, as shown in FIG. 4, a first threshold value and a second threshold value are set, and the first correlation amount is converted into the first correlation coefficient such that the first correlation coefficient has a correlation of 0 when the first correlation amount is smaller than or equal to the first threshold value, a correlation of 1 when the first correlation amount is larger than or equal to the second threshold value, and a correlation that increases with increasing correlation amount when the first correlation amount is between the first and second threshold values.

Figure 5:
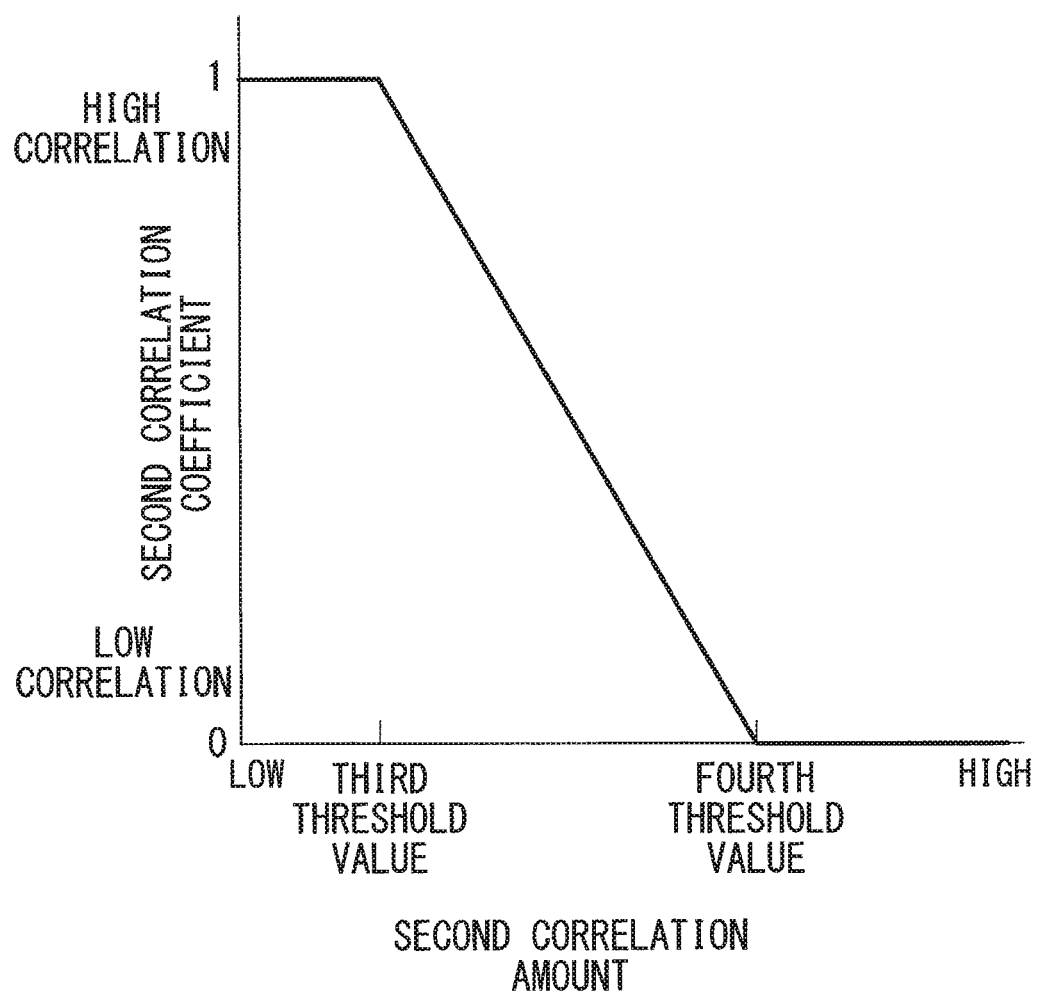
FIG. 5 illustrates an example of a map used by the correlation-coefficient calculating unit of the imaging apparatus in FIG. 1 for calculating a second correlation coefficient from a second correlation amount.

Furthermore, as shown in FIG. 5, the second correlation amount is converted into the second correlation coefficient such that the second correlation coefficient has a correlation of 1 when the second correlation amount is smaller than or equal to a third threshold value, a correlation of 0 when the second correlation amount is larger than or equal to a fourth threshold value, and a correlation that decreases with increasing correlation amount when the second correlation amount is between the third and fourth threshold values.

Figure 6:
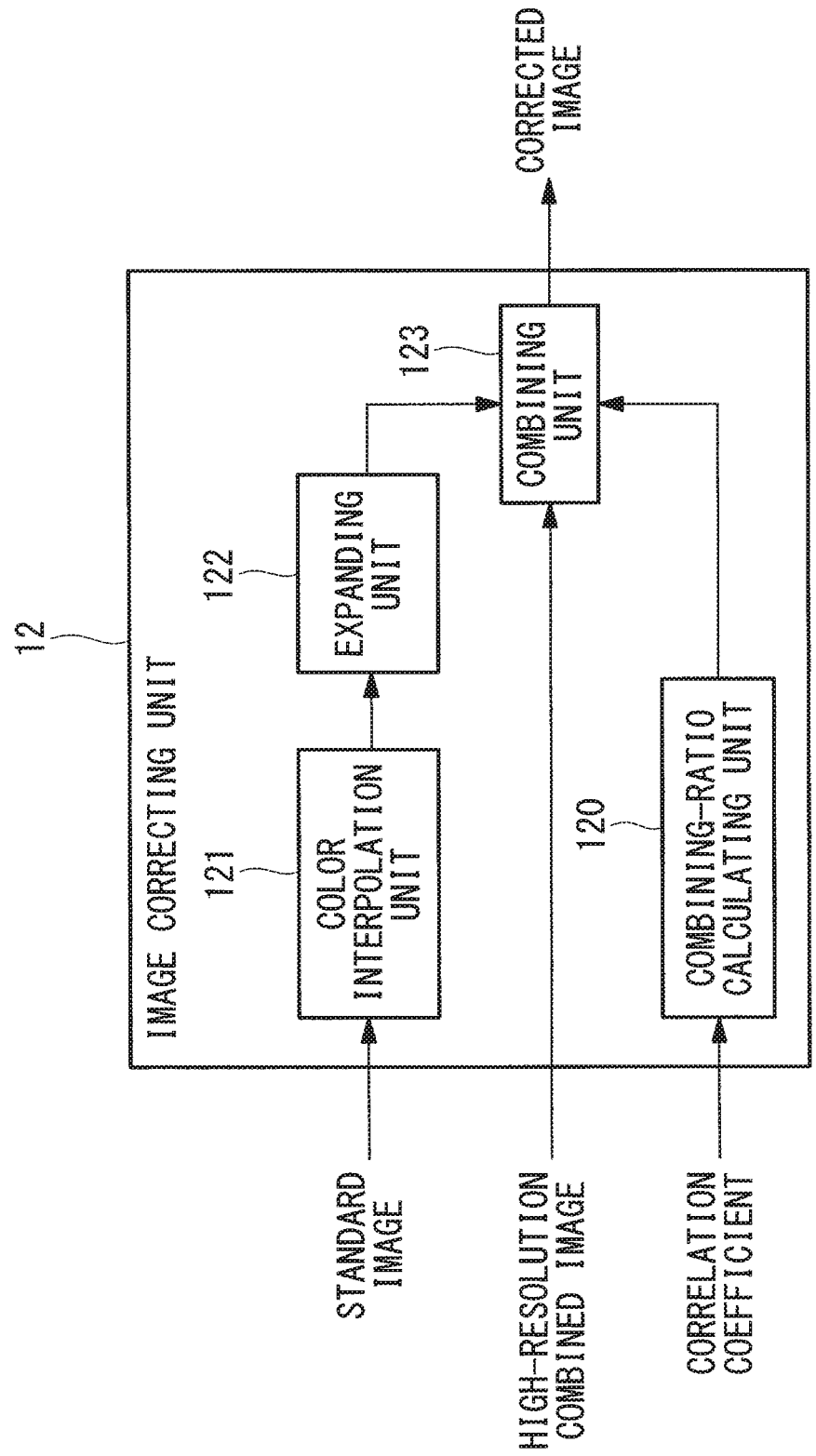
FIG. 6 is a block diagram illustrating an image correcting unit included in the imaging apparatus in FIG. 1.

As shown in FIG. 6, the image correcting unit 12 includes a combining-ratio calculating unit 120 that calculates a combining ratio based on the correlation coefficients output from the correlation-coefficient calculating unit 11, a color interpolation unit 121 that demosaics raw data of the standard image stored in the memory 4 so as to colorize the standard image, an expanding unit 122 that expands the colorized standard image into an image the same size as the combined image, and a combining unit 123 that combines the combined image generated by the high-resolution combining unit 9 with the expanded standard image in accordance with the combining ratio calculated by the combining-ratio calculating unit 120.

Figure 7:
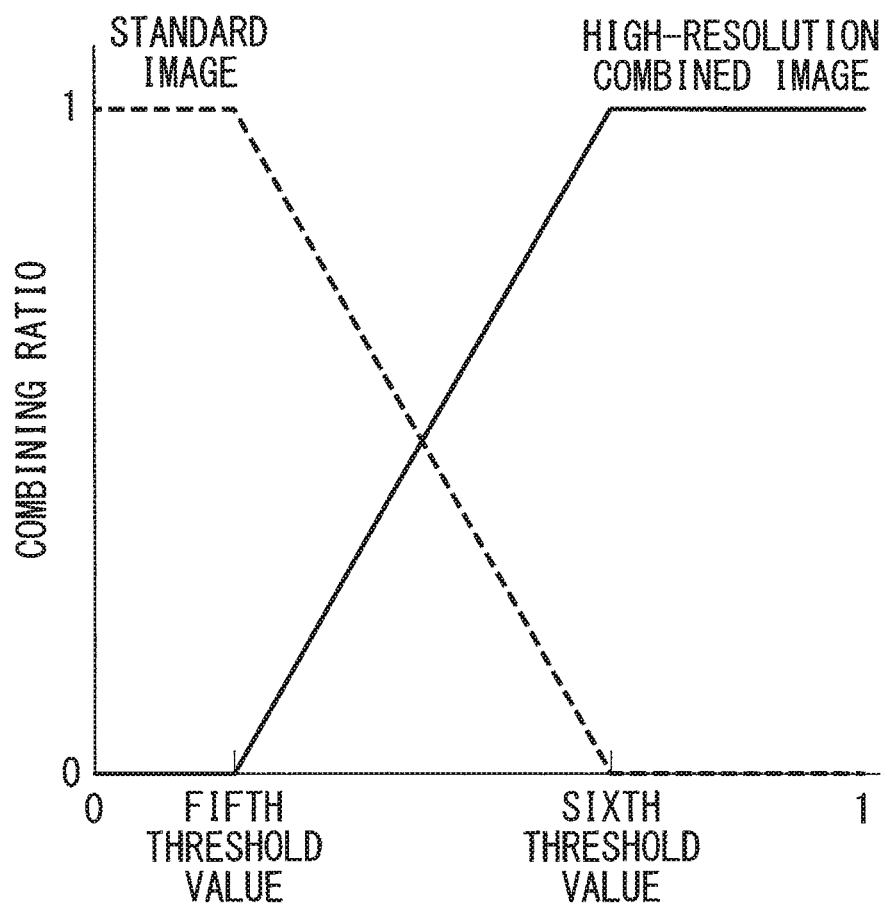
FIG. 7 illustrates an example of a map used by the image correcting unit in FIG. 1 for calculating a combining ratio from a third correlation coefficient.
Figure 9C:
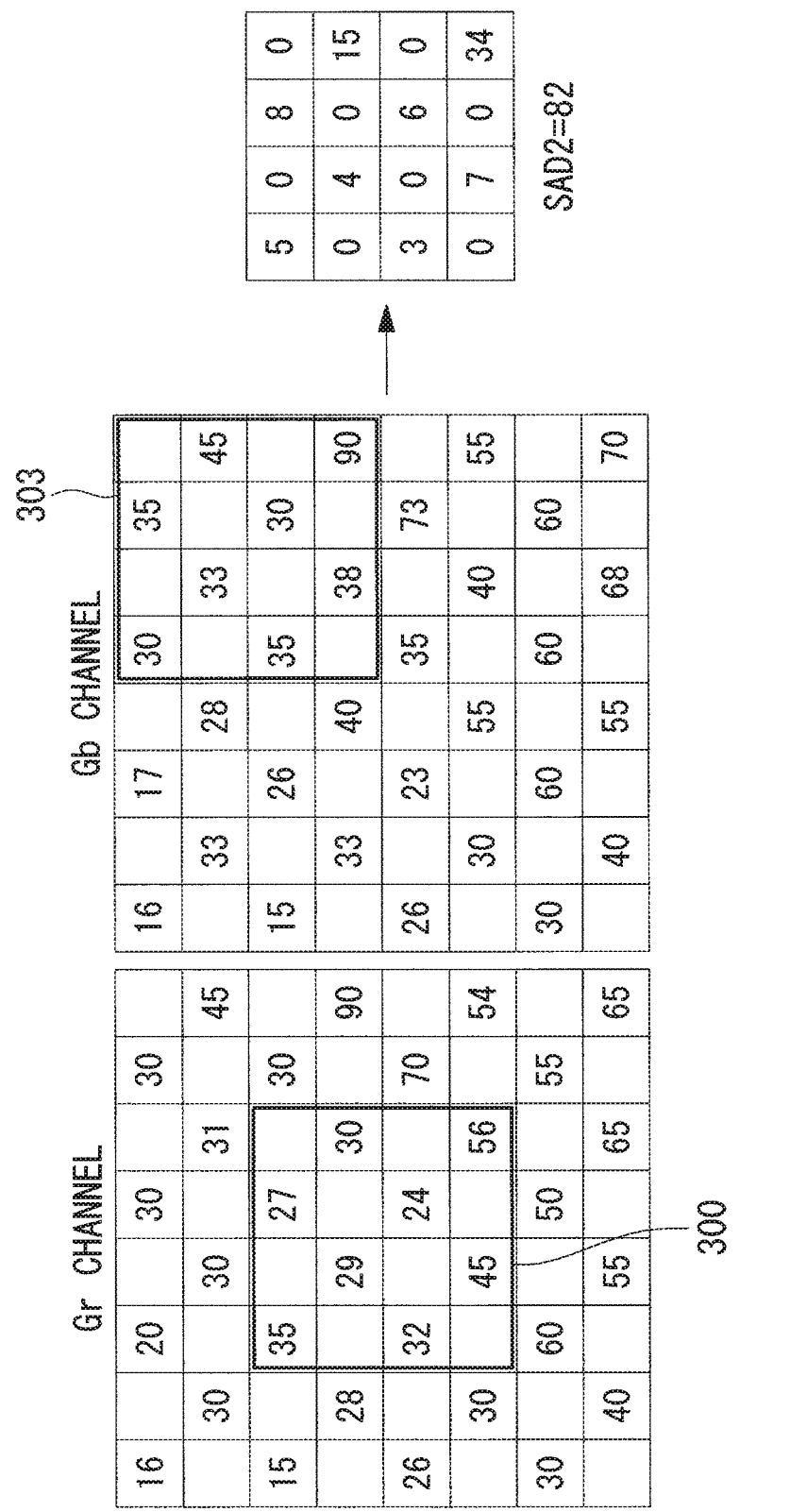
FIG. 9C illustrates a correlation-value calculation example having a specific example of pixel values in FIG. 3C with respect to the non-moving-object region in FIG. 8.
Figure 9E:
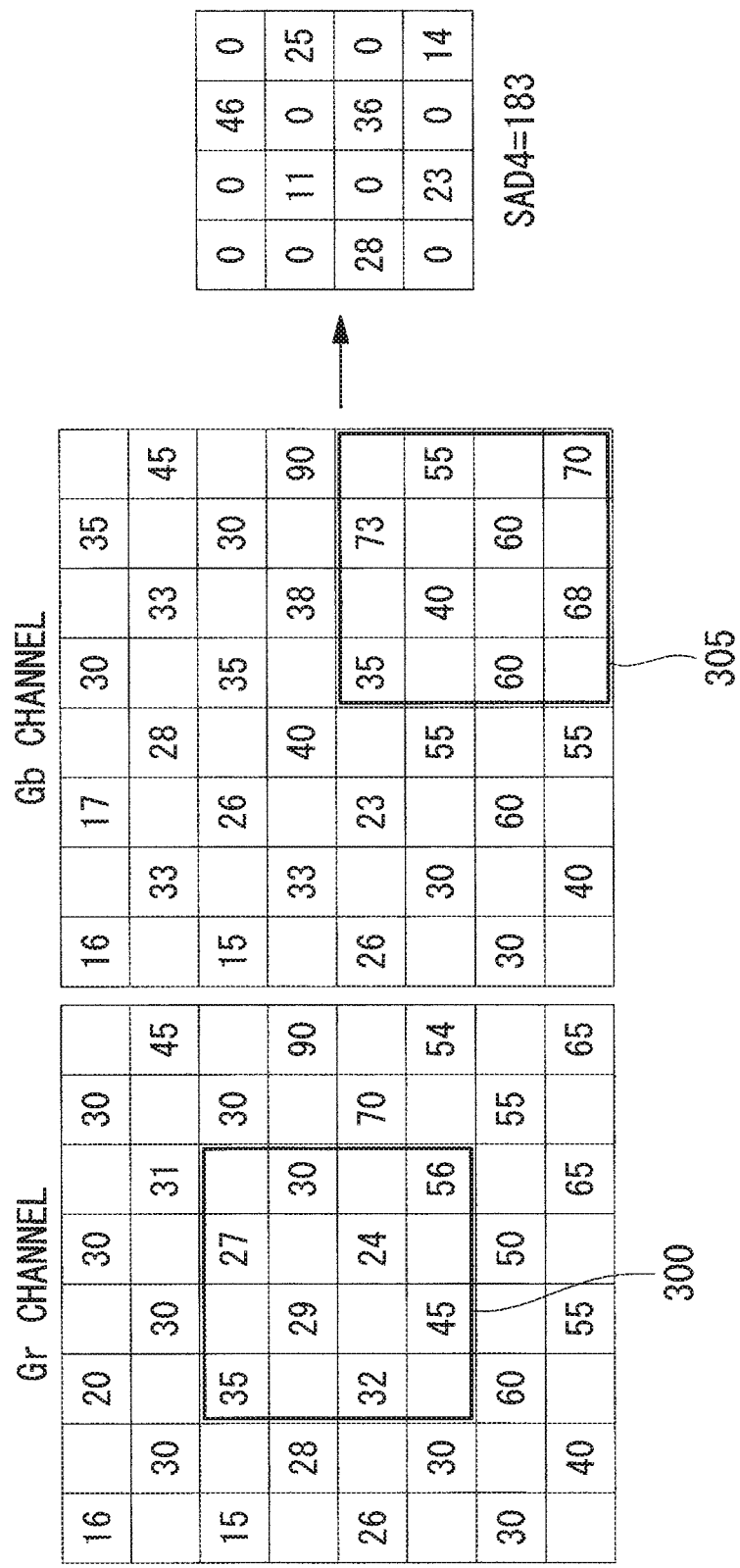
FIG. 9E illustrates a correlation-value calculation example having a specific example of pixel values in FIG. 3E with respect to the non-moving-object region in FIG. 8.
Figure 10B:
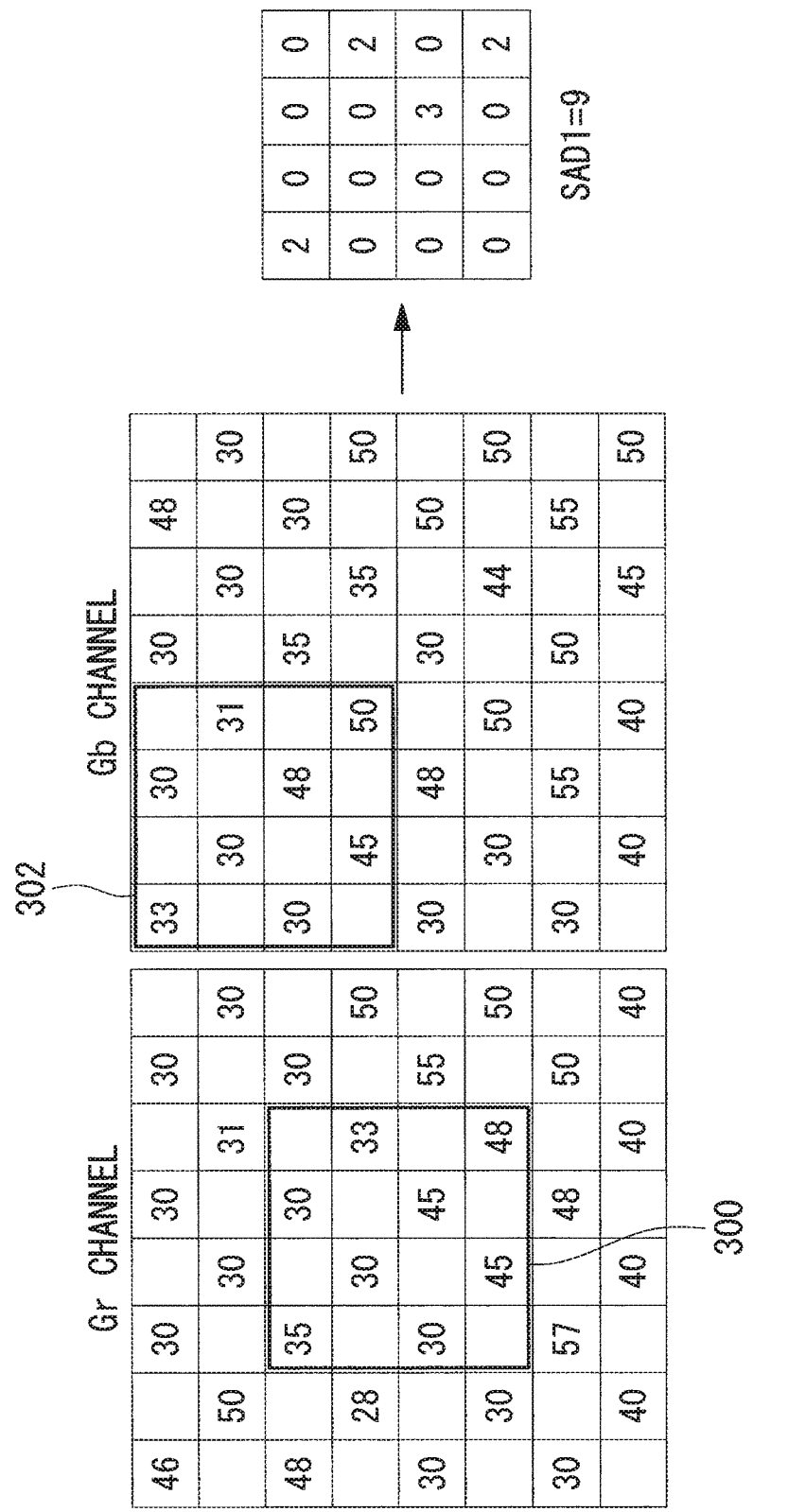
FIG. 10B illustrates a correlation-value calculation example having a specific example of pixel values in FIG. 3B with respect to the moving-object region in FIG. 8.
Figure 10C:
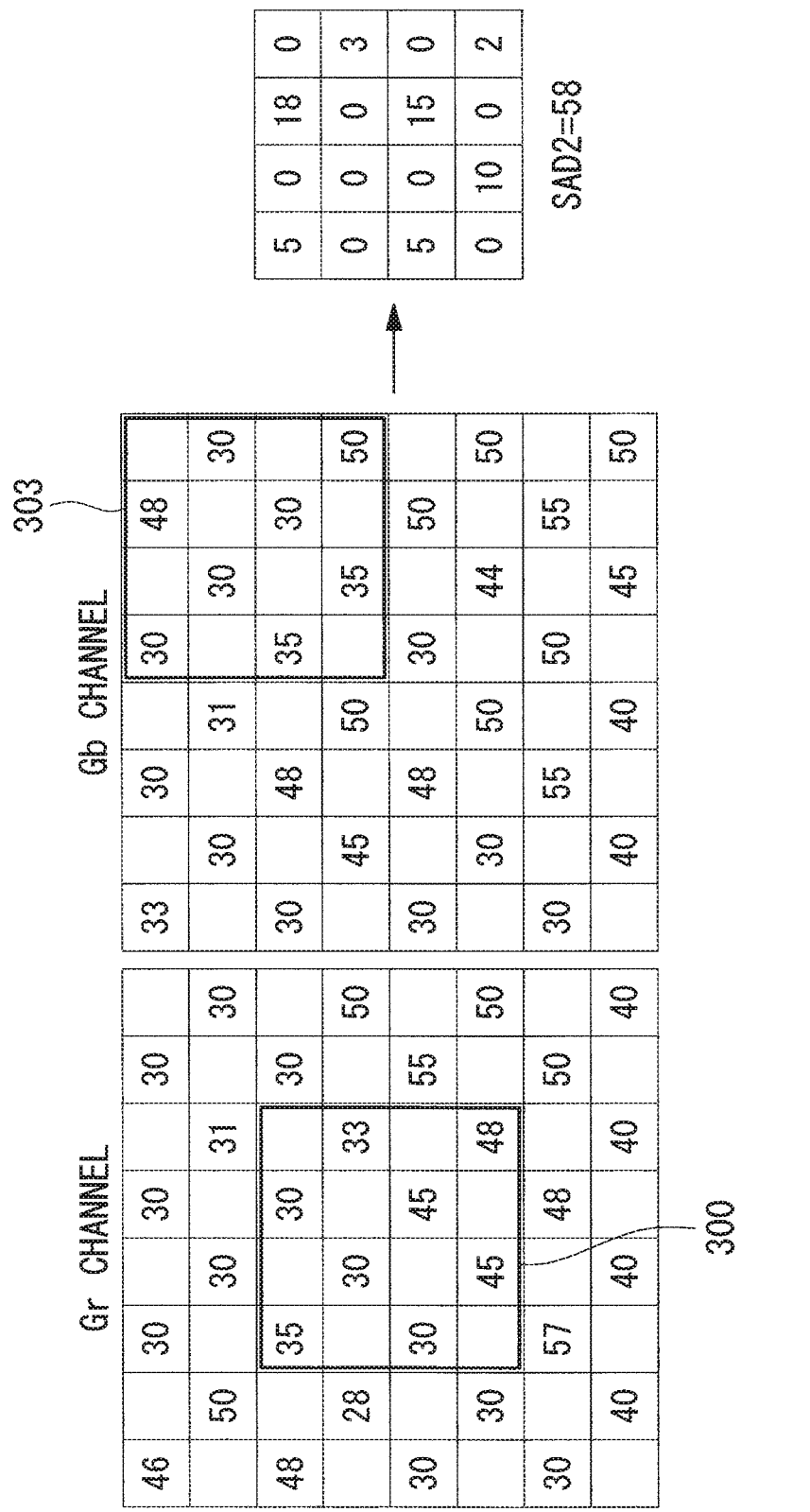
FIG. 10C illustrates a correlation-value calculation example having a specific example of pixel values in FIG. 3C with respect to the moving-object region in FIG. 8.

The combining-ratio calculating unit 120 includes a map in which a correlation coefficient and a combining ratio are associated with each other. For example, as shown in FIG. 7, in the map, the abscissa axis denotes a third correlation coefficient obtained by multiplying the first correlation coefficient by the second correlation coefficient, whereas the ordinate axis denotes the combining ratio.

In the map, there is only the expanded image of the standard image when the third correlation coefficient is smaller than or equal to a fifth threshold value, and there is only the high-resolution combined image when the third correlation coefficient is larger than or equal to a sixth threshold value. Moreover, between the fifth threshold value and the sixth threshold value, the combining ratio of the high-resolution combined image increases with increasing third correlation coefficient, and the combining ratio of the standard image increases with decreasing third correlation coefficient.

This processing is performed on all of the regions of interest, and the corrected image is ultimately output to the memory 4.

An image processing method according to an embodiment of the present invention will now be described with reference to FIGS. 8 to 14 by using a specific operation example of the image processing device 3.

With regard to an image shown in FIG. 8, subjects 80 and 81 are included in the image. The subject 80 is a non-moving object, whereas the subject 81 is a moving object. In this example, the subject 81 is positionally moving by a significant amount in eight images photographed while shifting the imaging element 6.

Figure 14:
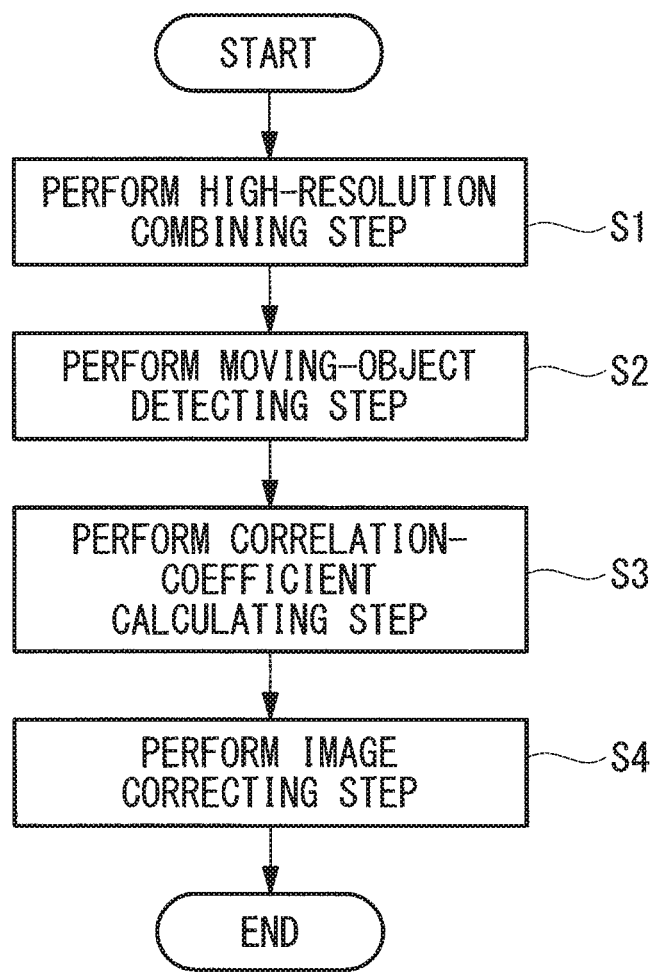
FIG. 14 is a flowchart illustrating an image processing method according to an embodiment of the present invention.

As shown in FIG. 14, in the image processing method according to this embodiment, the eight acquired images are first arranged in a high-resolution image space so that a high-resolution combined image is generated (high-resolution combining step S1).

Subsequently, the high-resolution combining unit 9 arranges the eight images, extracts a Gr channel and a Gb channel with respect to 8×8-pixel small regions 82 and 83 of the generated combined image, calculates SAD0 to SAD4 values in accordance with the above-described method, and calculates a correlation amount by calculating the magnitude relationship among these values (moving-object detecting step S2). In this case, the correlation amount is determined by using a combined image that has not undergone pixel interpolation by the high-resolution combining unit 9. With regard to the small region 82, the Gr channel and the Gb channel are shown in FIGS. 9A to 9E, and the calculated SAD0 to SAD4 values are as follows.

SAD0=82
SAD1=82
SAD2=82
SAD3=83
SAD4=183

As a result, the first correlation amount indicating the degree of edge is as follows:

first correlation amount=MaxSAD−SAD0=183−82=101

The second correlation amount indicating the degree of moving object is as follows:

second correlation amount=SAD0−MinSAD=82−82=0

With regard to the small region 83, the Gr channel and the Gb channel are shown in FIGS. 10A to 10E. Because the small region 83 is a region in which an image of a moving object is acquired in first and second photographed images, as shown in FIG. 8, the pixels of the moving object are arranged at pixel positions corresponding to the first and second images of the channels in the high-resolution image space. The calculated correlation values with respect to this small region 83 are as follows.

SAD0=82
SAD1=9
SAD2=58
SAD3=63
SAD4=88

As a result, the first correlation amount indicating the degree of edge is as follows:

first correlation amount=88−82=6

The second correlation amount indicating the degree of moving object is as follows:

second correlation amount=82−9=73

Figure 11:
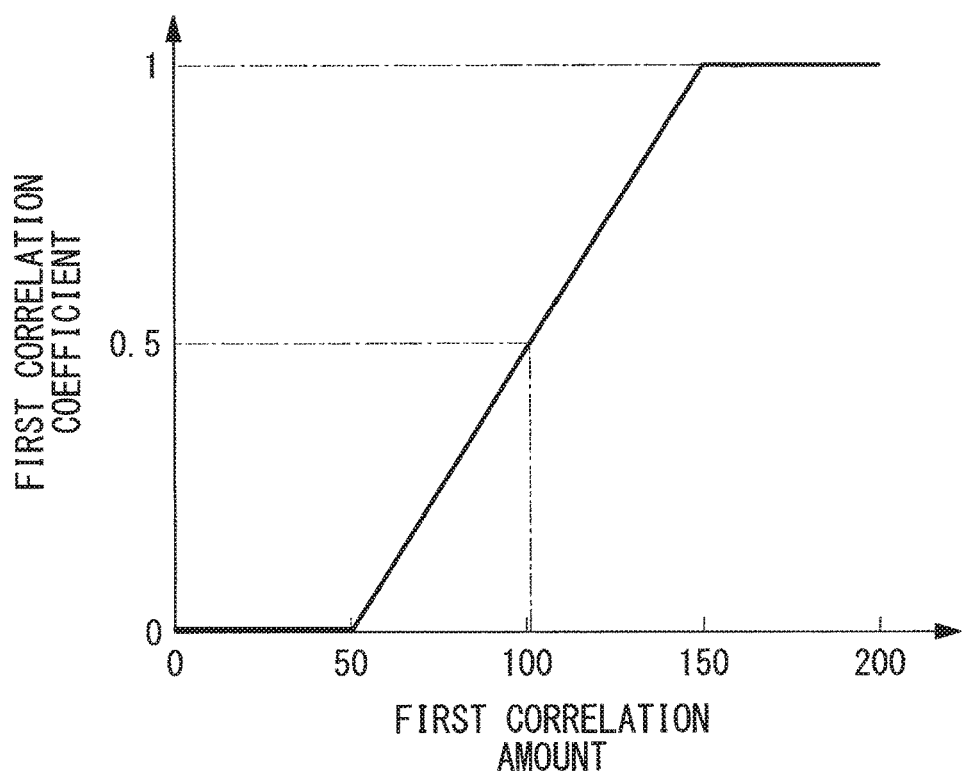
FIG. 11 illustrates an example of the relationship between the first correlation amount and the first correlation coefficient in the correlation-coefficient calculating unit included in the imaging apparatus in FIG. 1.
Figure 12:
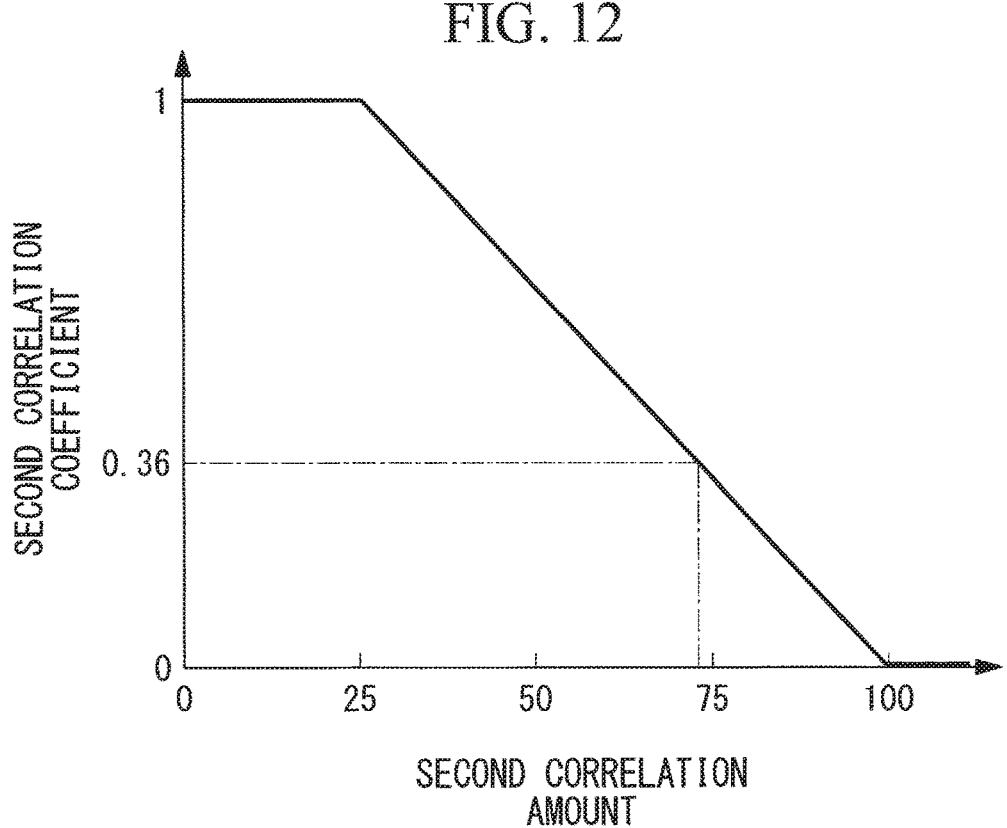
FIG. 12 illustrates an example of the relationship between the second correlation amount and the second correlation coefficient in the correlation-coefficient calculating unit included in the imaging apparatus in FIG. 1.

In the correlation-coefficient calculating unit 11, the first correlation amount and the second correlation amount are respectively converted into a first correlation coefficient and a second correlation coefficient (correlation-coefficient calculating step S3). For example, conversion processes as shown in FIGS. 11 and 12 are performed, so that a first correlation coefficient of 0.5 and a second correlation coefficient of 1 are obtained in the small region 82, and a first correlation coefficient of 0 and a second correlation coefficient of 0.36 are obtained in the small region 83.

Figure 13:
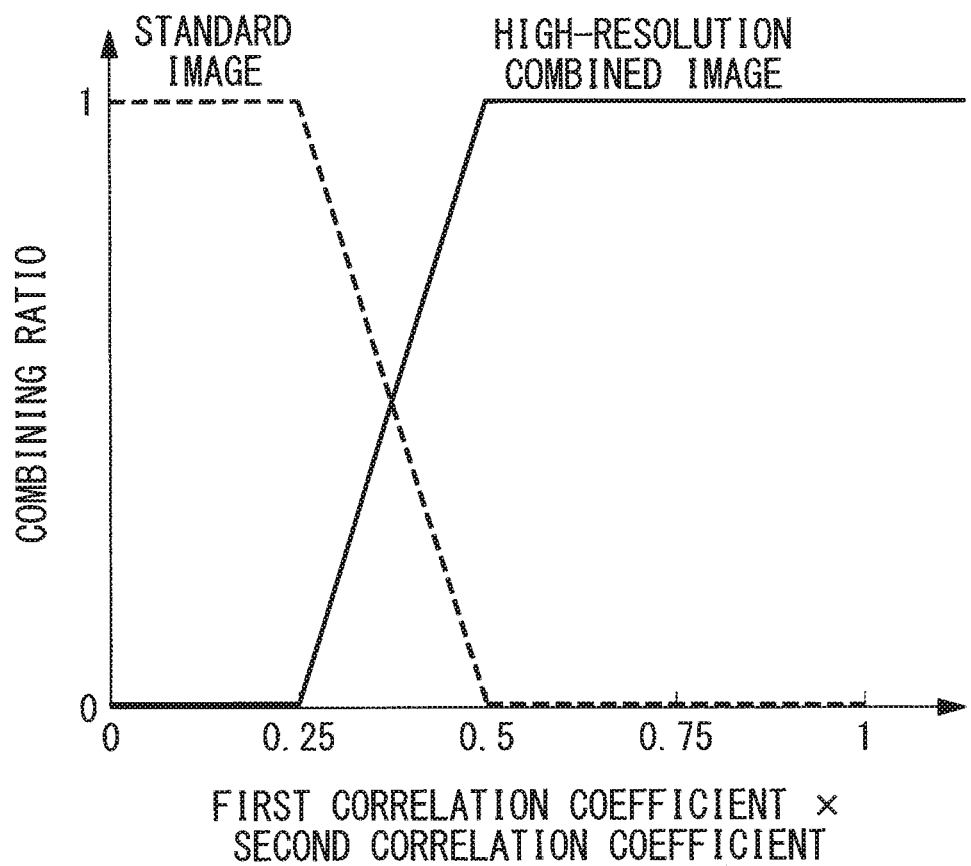
FIG. 13 illustrates an example of the combining ratio between a standard image and a high-resolution combined image in the image correcting unit included in the imaging apparatus in FIG. 1.

Then, in the image correcting unit 12, the standard image and the high-resolution combined image are combined in accordance with a combining ratio shown in FIG. 13 (image correcting step S4). In the small region 82, the first correlation coefficient multiplied by the second correlation coefficient (0.5×1) is equal to 0.5, so that the combining ratio of the high-resolution combined image is 1. In the small region 83, the first correlation coefficient multiplied by the second correlation coefficient (0×0.36) is equal to 0, so that the combining ratio of the standard image is 1.

Accordingly, the combining ratio of the standard image increases in the moving-object region, so that artifacts, such as a ghost image, are reduced, while the resolution can be improved since the combining ratio of the high-resolution combined image can be increased in the non-moving-object region.

In particular, in the related art in which the combining ratio is set based on the difference between a standard image and a reference image, if there is a moving object in a low-brightness region, it is not possible to distinguish between a moving object and a non-moving object due to the effect of noise, thus making it difficult to suppress the occurrence of artifacts and to improve the resolution at the same time.

Supposing that the related art is applied to the images used in this specific example, the SAD values would simply be extracted between identical positions corresponding to the SAD0 value. Thus, the SAD=82 in both small regions 82 and 83, so that the combining ratios of the small regions 82 and 83 cannot be distinguished from each other, thus it is clear that it is difficult to suppress the occurrence of artifacts and to improve the resolution at the same time.

In contrast, in this embodiment, a plurality of correlation values are determined between the combined images of Gr and Gb, and the combining ratio is calculated based on the correlation amounts calculated from the calculation result indicating the magnitude relationship between the correlation values.

Therefore, even in a case where there is movement in a low-brightness region but such movement is lost in noise due to a small difference value caused by a small pixel value, a moving object and a non-moving object can be reliably distinguished from each other. This is advantageous in that the occurrence of artifacts caused by movement of a subject can be suppressed while the image resolution can be improved.

Figure 15:
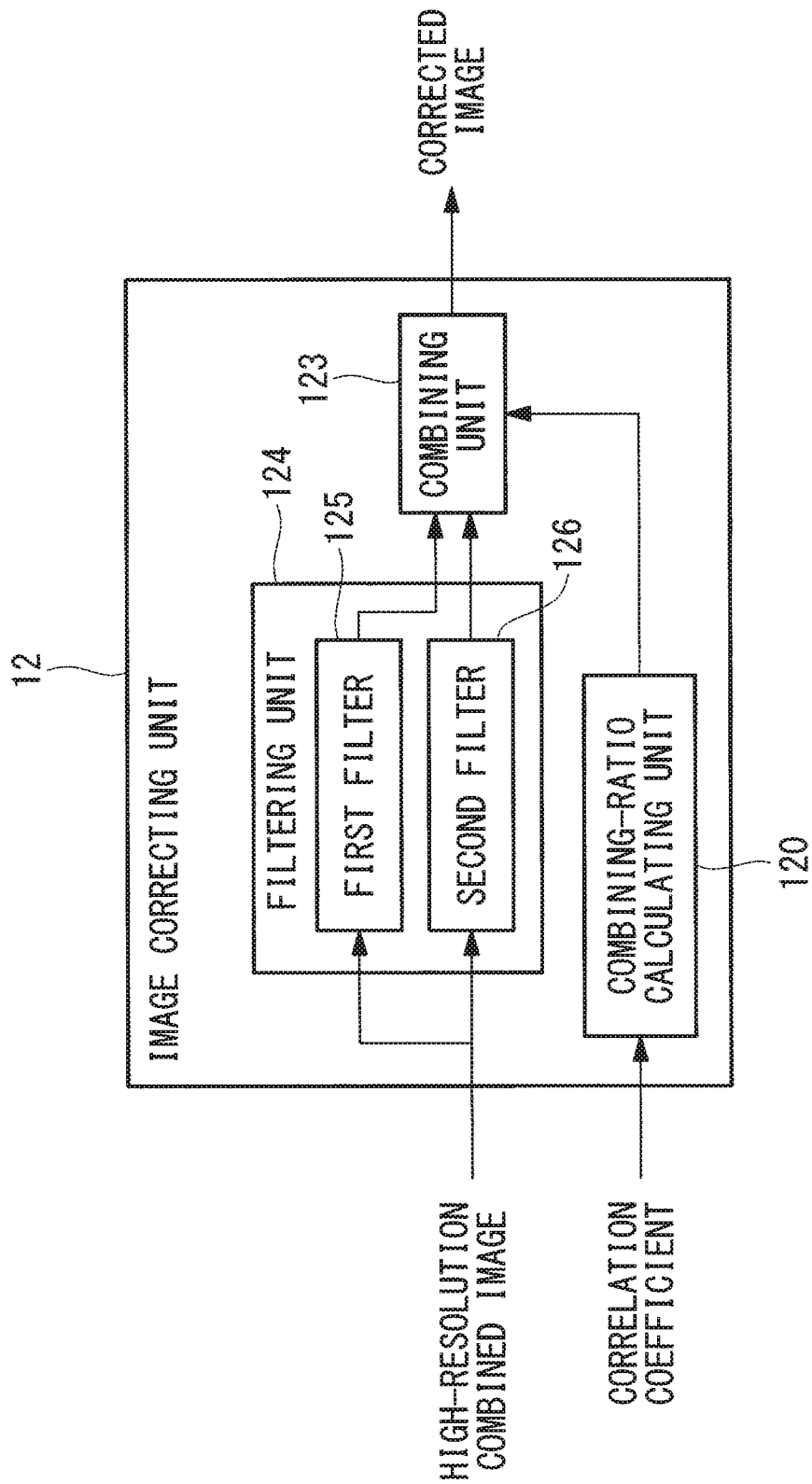
FIG. 15 is a block diagram illustrating a modification of the image correcting unit of the imaging apparatus in FIG. 1.

In this embodiment, the combined image is corrected by combining the standard image and the combined image in accordance with the combining ratio calculated by the combining-ratio calculating unit 120. Alternatively, as shown in FIG. 15, instead of using the standard image, the combined image may be input to a filtering unit 124 equipped with two types of filters (i.e., a first filter 125 and a second filter 126) having different low-pass effects, and filtered images may be combined in accordance with the combining ratio calculated by the combining-ratio calculating unit 120.

Accordingly, in a region with low correlation, the image is blurred by increasing the combining ratio of an image processed by the filter having the higher low-pass effect, whereas in a region with high correlation, a clear image can be acquired by increasing the combining ratio of an image processed by the filter having the lower low-pass effect.

Accordingly, this is advantageous in that the occurrence of artifacts caused by movement of a subject or positional displacement can be effectively suppressed. With regard to the filter having the lower low-pass effect, it is assumed that a case where a combined image is directly output (without being filtered) is included.

Figure 16:
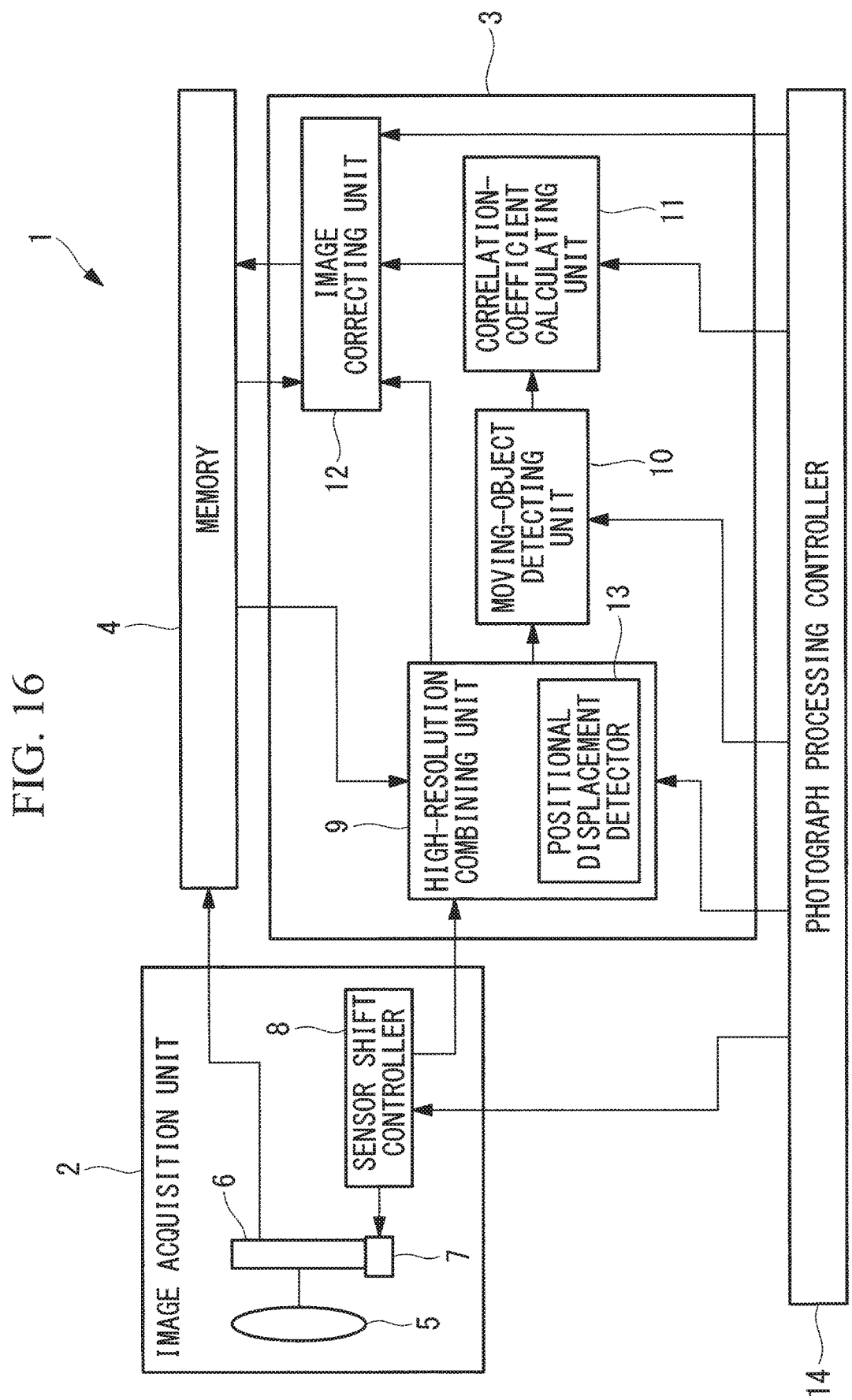
FIG. 16 is a block diagram illustrating a modification of the imaging apparatus in FIG. 1.

Furthermore, as shown in FIG. 16, this embodiment may also be provided with a photograph processing controller 14 that controls the sensor shift controller 8, the high-resolution combining unit 9, the moving-object detecting unit 10, the correlation-coefficient calculating unit 11, and the image correcting unit 12.

Figure 17:
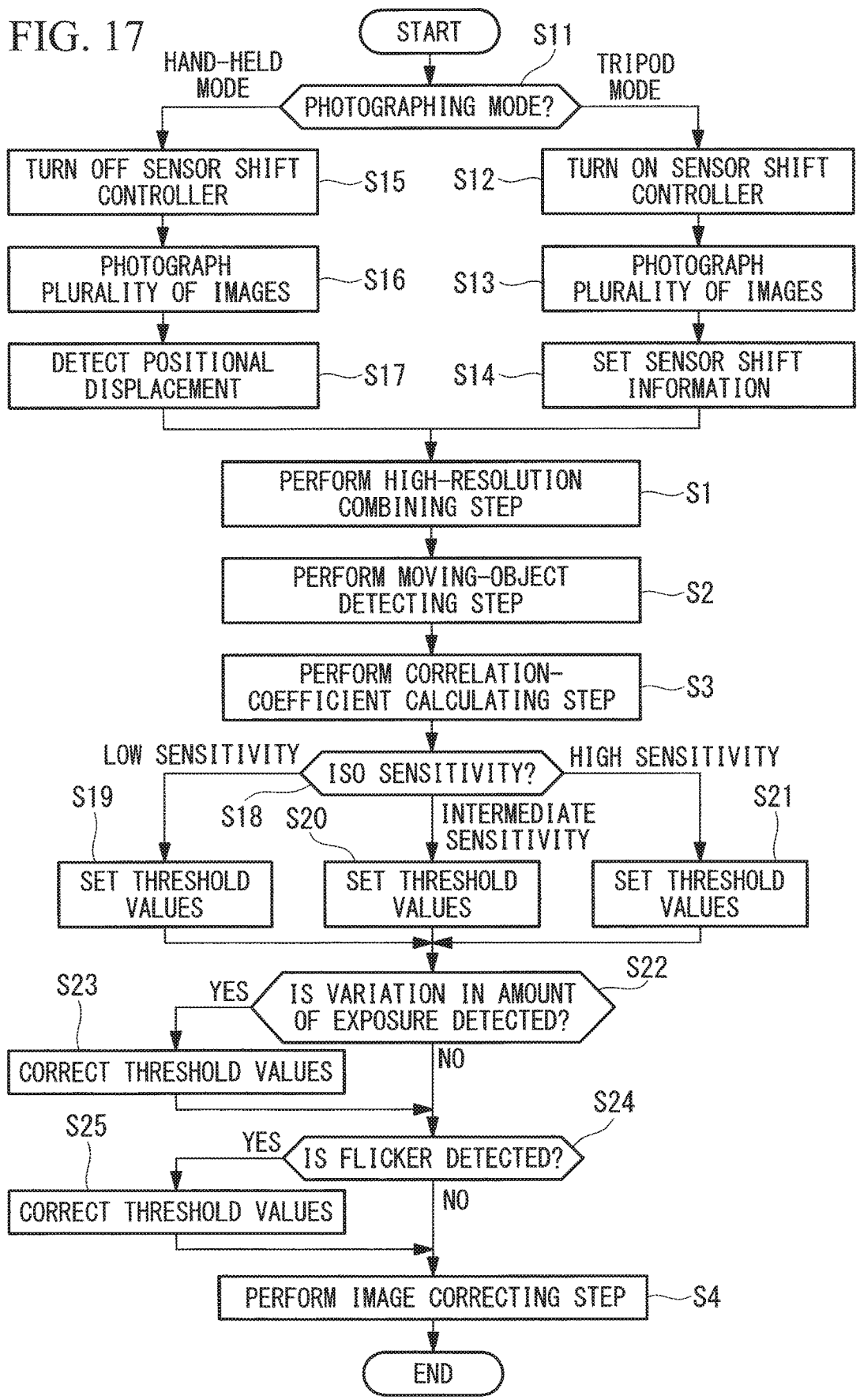
FIG. 17 is a flowchart illustrating the operation of the imaging apparatus in FIG. 16.

As shown in FIG. 17, for example, the photograph processing controller 14 detects a photographing mode based on a signal from a camera-shake sensor (step S11), turns on the sensor shift controller 8 if the photographing mode is a tripod mode (step S12), photographs a plurality of images (step S13), and outputs sensor shift information from the sensor shift controller 8 to the high-resolution combining unit 9 (step S14).

If the photographing mode is a hand-held mode, the photograph processing controller 14 turns off the sensor shift controller 8 (step S15), photographs a plurality of images (step S16), and causes a positional displacement detector 13 of the high-resolution combining unit 9 to detect the amount of displacement between the plurality of images (step S17). Since it suffices that the plurality of images can be photographed with deviation therebetween even in the hand-held mode, the sensor shift controller 8 may be turned on.

Subsequently, the photograph processing controller 14 causes the high-resolution combining unit 9 to combine the plurality of images (step S1), causes the moving-object detecting unit 10 to calculate a plurality of correlation values from the Gr and Gb combined images (step S2) and to calculate a correlation amount from the calculation result indicating the magnitude relationship between the correlation values, and causes the correlation-coefficient calculating unit 11 to convert the correlation amount into a correlation coefficient (step S3).

When the correlation-coefficient calculating unit 11 converts the correlation amount into a correlation coefficient, the photograph processing controller 14 can cause the correlation-coefficient calculating unit 11 to perform the conversion process in accordance with ISO sensitivity. The photograph processing controller 14 acquires ISO sensitivity information during the photographing of the plurality of images (step S18) and sets the first threshold value to the fourth threshold value in accordance with whether the ISO sensitivity is low sensitivity, intermediate sensitivity, or high sensitivity (step S19 to step S21).

Since noise increases with increasing ISO sensitivity, there is a possibility that the second correlation amount (i.e., the degree of moving object) may increase even in a stationary section. Therefore, the third threshold value and the fourth threshold value are reduced, and the conversion process is performed such that the degree of moving object does not increase even in a stationary section. Alternatively, on the map of the combining ratio generated by the image correcting unit 12, the fifth threshold value and the sixth threshold value are reduced with increasing ISO sensitivity, so that the combining ratio of the combined image or the image filtered using the filter having the lower low-pass effect is increased.

The photograph processing controller 14 detects whether or not the amount of exposure varies between the plurality of images at the time of the photographing process (step S22) and reduces the fifth threshold value and the sixth threshold value depending on the amount of variation (step S23). Since there is a possibility that the correlation decreases even in a stationary section when the amount of variation increases, the fifth threshold value and the sixth threshold value are reduced so that the combining ratio of the combined image or the image filtered using the filter having the lower low-pass effect is increased.

The photograph processing controller 14 detects whether or not there is flicker between the plurality of images at the time of the photographing process (step S24) and reduces the fifth threshold value and the sixth threshold value depending on the amount of flicker (step S25). Since there is a possibility that the correlation decreases even in a stationary section when the amount of flicker increases, the fifth threshold value and the sixth threshold value are reduced so that the combining ratio of the combined image or the image filtered using the filter having the lower low-pass effect is increased.

Figure 18:
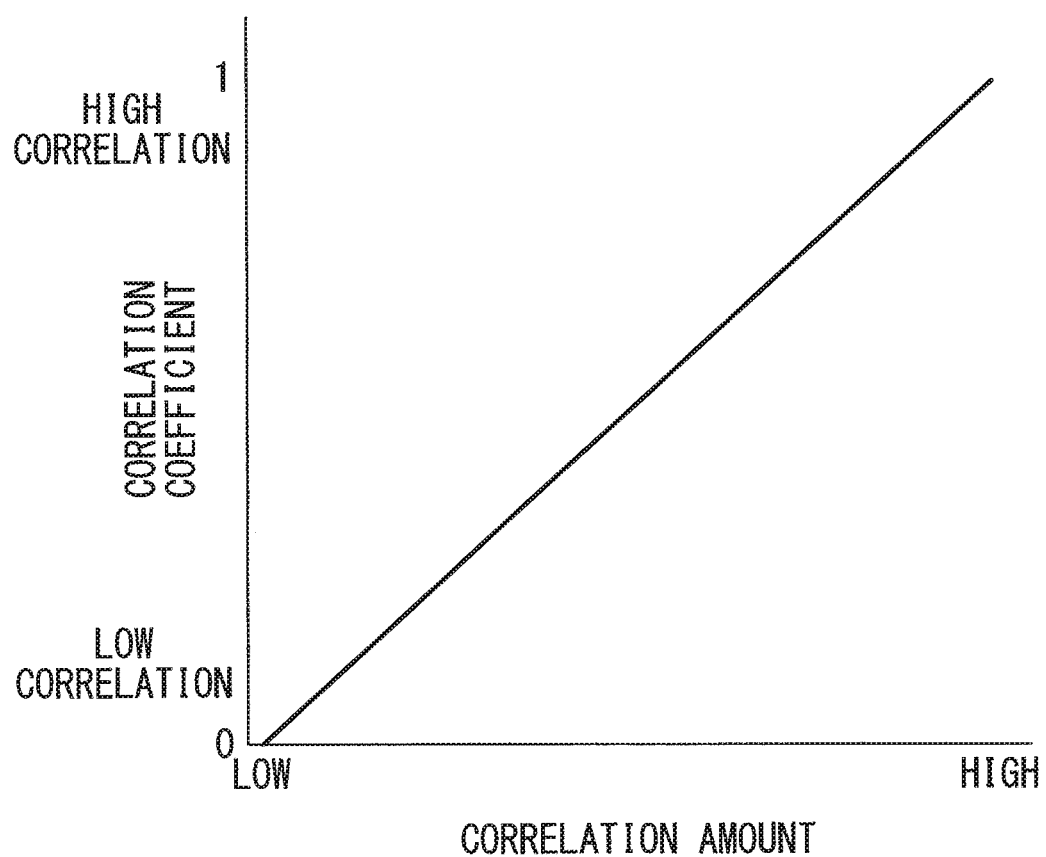
FIG. 18 illustrates another example of the relationship between a correlation amount and a correlation coefficient in the correlation-coefficient calculating unit of the imaging apparatus in FIG. 1.

Furthermore, when the correlation-coefficient calculating unit 11 converts a correlation amount into a correlation coefficient in this embodiment, the conversion process is performed along a polygonal line by setting the first threshold value to the fourth threshold value, as shown in FIGS. 4 and 5. Alternatively, there are other conceivable methods for the conversion process, such as performing the conversion process linearly, as shown in FIG. 18, increasing the number of segments of the polygonal line by providing more threshold values, or performing the conversion process in a nonlinear manner.

Figure 19:
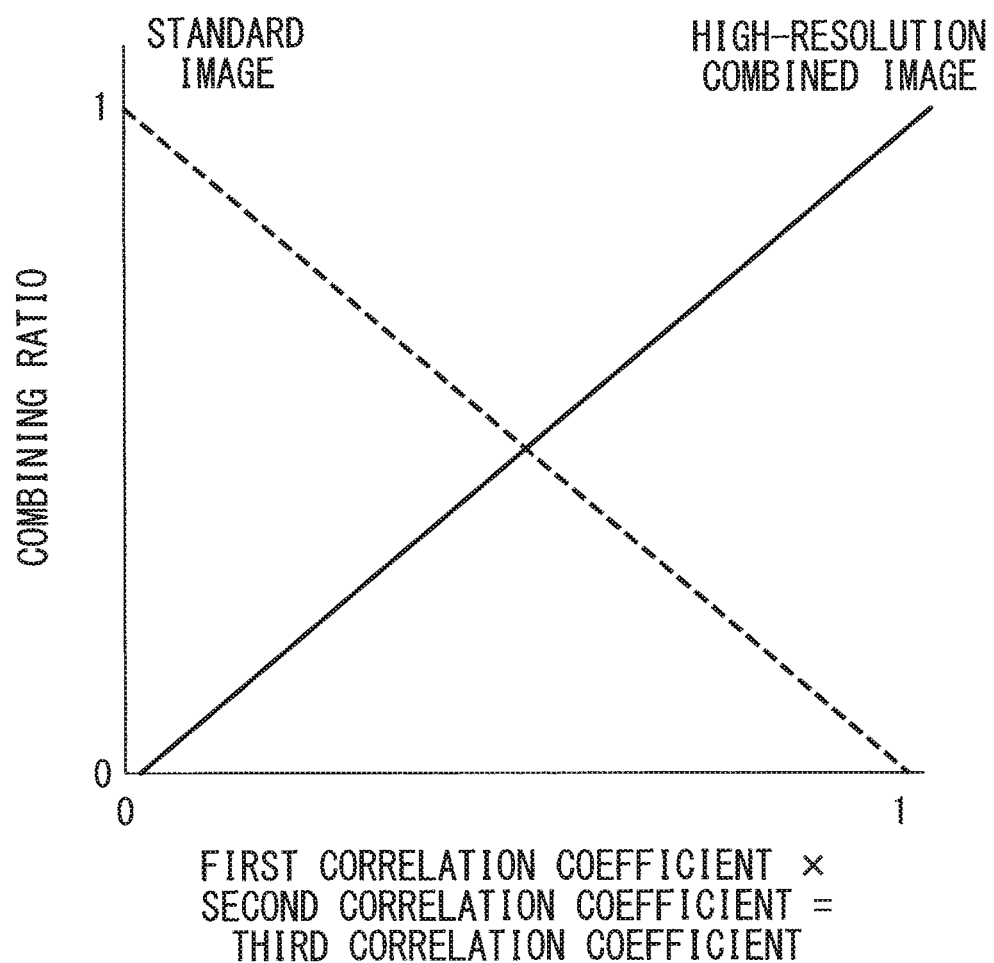
FIG. 19 illustrates another example of the combining ratio between a standard image and a high-resolution combined image in the image correcting unit included in the imaging apparatus in FIG. 1.

Furthermore, the map of the combining ratio used by the image correcting unit 12 is provided with the fifth threshold value and the sixth threshold value, as shown in FIG. 7, and there is only the expanded image of the standard image when the correlation coefficient is smaller than or equal to the fifth threshold value, and only a high-resolution combined image when the correlation coefficient is larger than or equal to the sixth threshold value. Alternatively, the map may be such that the expanded image of the standard image and the high-resolution combined image have combining ratios for all correlation amounts, as shown in FIG. 19, or the map is not limited to a type in which the combining ratio changes linearly in accordance with the correlation amount.

Furthermore, although a correlation amount is calculated from a plurality of SAD values in this embodiment, each SAD value may be replaced by an average value of pixel-difference values, a difference between a maximum value and a minimum value of pixel-difference values, an SSD (sum of squared difference) value, or an NCC (normalized cross correlation) value. Furthermore, although two correlation amounts, namely, the first correlation amount and the second correlation amount, are calculated from the calculation result indicating the magnitude relationship between the plurality of SAD values in this embodiment, a larger number of correlation amounts may be calculated.

In this embodiment, the SAD values are calculated by setting an 8×8-pixel region as the region of interest and setting a 4×4-pixel region therein as a calculation region. Alternatively, the sizes of the region of interest and the calculation region are not limited to these sizes.

Furthermore, the size of the calculation region may be changeable in accordance with the characteristics of the image region. For example, the upper limit for the size of the calculation region may be set to 32×32 pixels, and the lower limit may be set to 4×4 pixels. The size of the region of interest may be set closer toward 4×4 pixels as the contrast of the image increases so that a correlation amount may be determined more finely. In contrast, the size of the region of interest may be set closer toward 32×32 pixels as the contrast decreases.

Accordingly, in a high-contrast region, a moving object and a non-moving object can be reliably distinguished from each other for each specific region, thereby achieving both reduced artifacts and higher resolution. In a low-contrast region, such as a low-brightness region, correlation amounts are calculated based on a larger number of pieces of pixel-value information, so that correlation amounts for distinguishing a moving object and a non-moving object from each other from the calculation result indicating the magnitude relationship between the correlation amounts can be reliably calculated.

In either case, in this embodiment, a moving object and a non-moving object can be reliably distinguished from each other by calculating the combining ratio based on the correlation amounts determined from the calculation result indicating the magnitude relationship of the plurality of correlation amounts between the combined images, thereby achieving both reduced artifacts and improved resolution.

As an alternative to the above-described case where the image processing method according to this embodiment is performed by the image processing device 3, the image processing method can also be performed by an image processing program executable by a computer. In this case, a processor, such as a central processing unit (CPU), executes the image processing program so as to perform the image processing method according to this embodiment.

Specifically, an image processing program stored in a recording medium is read, and a processor, such as a central processing unit (CPU), executes the read image processing program. In this case, the recording medium is configured to store the program and data, and the function thereof can be realized by using an optical disk (DVD, CD or the like), a hard disk drive, or a memory (card-type memory, ROM or the like).

The above-described embodiment leads to the following invention.

According to an aspect of the present invention, an image processing device includes a high-resolution combining unit, a moving-object detecting unit, and an image correcting unit. The high-resolution combining unit generates a high-resolution combined image by combining a standard image with at least one reference image other than the standard image in a high-resolution image space having higher resolution than the standard image or the at least one reference image. The standard image and the at least one reference image are acquired by photographing a subject in a time-series manner by using an imaging element having a plurality of types of color filters arranged for each pixel. The moving-object detecting unit determines at least one correlation amount by calculating a magnitude relationship between a plurality of correlation values within an arbitrary region of the high-resolution combined image generated by the high-resolution combining unit. The image correcting unit corrects the high-resolution combined image based on the correlation amount determined by the moving-object detecting unit.

According to this aspect, the standard image and the at least one reference image acquired by the imaging element are combined by the high-resolution combining unit, so that a high-resolution combined image having higher resolution than the standard image or the reference image is generated. After the plurality of correlation values are determined with respect to the arbitrary region of the generated high-resolution combined image, the moving-object detecting unit calculates the magnitude relationship between the correlation values, so that at least one correlation amount is calculated. Then, the image correcting unit corrects the high-resolution combined image by using the at least one calculated correlation amount.

Specifically, the high-resolution combined image is corrected not based on a single correlation value but based on at least one correlation amount determined by calculating the magnitude relationship between the plurality of correlation values. Therefore, even in a situation where there is movement in a low-brightness region but such movement is lost in noise due to a small pixel value when a single correlation value is used, a moving object and a non-moving object can be distinguished from each other based on at least one correlation amount determined by calculating the magnitude relationship between the plurality of correlation values. Consequently, the resolution of the high-resolution combined image can be improved while suppressing the occurrence of artifacts caused by movement of the subject.

In the above aspect, the image processing device may further include a correlation-coefficient calculating unit that calculates a correlation coefficient from the at least one correlation amount determined by the moving-object detecting unit. The image correcting unit may combine the high-resolution combined image with the standard image in accordance with a combining ratio based on the correlation coefficient calculated by the correlation-coefficient calculating unit so as to correct the high-resolution combined image.

Accordingly, the high-resolution combined image and the standard image are combined in accordance with the combining ratio based on the correlation coefficient calculated by the correlation-coefficient calculating unit from the at least one correlation amount determined by calculating the magnitude relationship between the plurality of correlation values. Thus, when the subject is a moving object, the combining ratio of the standard image is increased, whereas when the subject is a non-moving object, the combining ratio of the high-resolution combined image is increased, thereby improving the resolution of the high-resolution combined image while suppressing the occurrence of artifacts caused by movement of the subject.

Furthermore, in the above aspect, the image processing device may further include a correlation-coefficient calculating unit that calculates a correlation coefficient from the at least one correlation amount determined by the moving-object detecting unit. The image correcting unit may combine two images obtained by applying filters having different low-pass effects to the high-resolution combined image in accordance with a combining ratio based on the correlation coefficient calculated by the correlation-coefficient calculating unit so as to correct the high-resolution combined image.

Accordingly, two images obtained by applying filters having different low-pass effects to the high-resolution combined image are combined in accordance with the combining ratio based on the correlation coefficient calculated by the correlation-coefficient calculating unit from the at least one correlation amount determined by calculating the magnitude relationship between the plurality of correlation values. Thus, when the subject is a moving object, the combining ratio of the image processed by the filter having the higher low-pass effect is increased, whereas when the subject is a non-moving object, the combining ratio of the image processed by the filter having the lower low-pass effect is increased, thereby improving the resolution of the high-resolution combined image while suppressing the occurrence of artifacts caused by movement of the subject.

Furthermore, in the above aspect, the moving-object detecting unit may determine the at least one correlation amount by calculating the magnitude relationship between the plurality of correlation values calculated between two comparison images constituted of pixels, which correspond to different types of color filters, of the high-resolution combined image generated by the high-resolution combining unit.

Accordingly, the plurality of correlation values are calculated between the two comparison images constituted by arranging, in the high-resolution image space, the pixel values acquired simultaneously by the pixels corresponding to the different types of color filters provided in the imaging element, and the magnitude relationship between the plurality of correlation values is calculated. Consequently, a correlation amount with which a moving object and a non-moving object can be clearly distinguished from each other can be calculated, thereby improving the resolution of the high-resolution combined image while suppressing the occurrence of artifacts caused by movement of the subject.

Furthermore, in the above aspect, the correlation values may include at least two correlation values selected from a correlation value calculated by using regions at identical positions of the two comparison images and a correlation value calculated by using regions at relatively-displaced positions of the two comparison images.

Furthermore, in the above aspect, it is preferable that the correlation value calculated by using the regions at the relatively displaced positions of the two comparison images be calculated by using regions in which the positions of the two comparison images are relatively displaced from each other by m pixels in a horizontal direction and n pixels in a vertical direction when preset high-resolution multiplying factors are m× in the horizontal direction and n× in the vertical direction.

Accordingly, the correlation value calculated by using the relatively-displaced regions of the two comparison images can be used for calculating a correlation amount with which a moving object and a non-moving object can be clearly distinguished from each other, thereby improving the resolution of the high-resolution combined image while suppressing the occurrence of artifacts caused by movement of the subject.

According to another aspect of the present invention, an imaging apparatus includes an image acquisition unit that acquires a standard image and a reference image, and also includes the aforementioned image processing device that processes the standard image and the reference image acquired by the image acquisition unit.

According to another aspect of the present invention, an image processing method includes: a high-resolution combining step for generating a high-resolution combined image by combining a standard image with at least one reference image other than the standard image in a high-resolution image space having higher resolution than the standard image or the at least one reference image, the standard image and the at least one reference image being acquired by photographing a subject in a time-series manner by using an imaging element having a plurality of types of color filters arranged for each pixel; a moving-object detecting step for determining at least one correlation amount by calculating a magnitude relationship between a plurality of correlation values within an arbitrary region of the high-resolution combined image generated in the high-resolution combining step; and an image correcting step for correcting the high-resolution combined image based on the correlation amount determined in the moving-object detecting step.

In the above aspect, the image processing method may further include a correlation-coefficient calculating step for calculating a correlation coefficient from the at least one correlation amount determined in the moving-object detecting step. The image correcting step may include combining the high-resolution combined image with the standard image in accordance with a combining ratio based on the correlation coefficient calculated in the correlation-coefficient calculating step so as to correct the high-resolution combined image.

Furthermore, in the above aspect, the image processing method may further include a correlation-coefficient calculating step for calculating a correlation coefficient from the at least one correlation amount determined in the moving-object detecting step. The image correcting step may include combining two images obtained by applying filters having different low-pass effects to the high-resolution combined image in accordance with a combining ratio based on the correlation coefficient calculated in the correlation-coefficient calculating step so as to correct the high-resolution combined image.

Furthermore, in the above aspect, the moving-object detecting step may include determining the at least one correlation amount by calculating the magnitude relationship between the plurality of correlation values calculated between two comparison images constituted of pixels, which correspond to different types of color filters, of the high-resolution combined image generated in the high-resolution combining step.

Furthermore, in the above aspect, the correlation values may include at least two correlation values selected from a correlation value calculated by using regions at identical positions of the two comparison images and a correlation value calculated by using regions at relatively displaced positions of the two comparison images.

Furthermore, in the above aspect, it is preferable that the correlation value calculated by using the regions at the relatively displaced positions of the two comparison images be calculated by using regions in which the positions of the two comparison images are relatively displaced from each other by m pixels in a horizontal direction and n pixels in a vertical direction when preset high-resolution multiplying factors are m× in the horizontal direction and n× in the vertical direction.

Another aspect of the present invention provides an image processing program causing a computer to execute a process, the process including: a high-resolution combining step for generating a high-resolution combined image by combining a standard image with at least one reference image other than the standard image in a high-resolution image space having higher resolution than the standard image or the at least one reference image, the standard image and the at least one reference image being acquired by photographing a subject in a time-series manner by using an imaging element having a plurality of types of color filters arranged for each pixel; a moving-object detecting step for determining at least one correlation amount by calculating a magnitude relationship between a plurality of correlation values within an arbitrary region of the high-resolution combined image generated in the high-resolution combining step; and an image correcting step for correcting the high-resolution combined image based on the correlation amount determined in the moving-object detecting step.

Another aspect of the present invention provides a non-transitory computer readable recording medium storing an image processing program causing a computer to execute a process, the process including: a high-resolution combining step for generating a high-resolution combined image by combining a standard image with at least one reference image other than the standard image in a high-resolution image space having higher resolution than the standard image or the at least one reference image, the standard image and the at least one reference image being acquired by photographing a subject in a time-series manner by using an imaging element having a plurality of types of color filters arranged for each pixel; a moving-object detecting step for determining at least one correlation amount by calculating a magnitude relationship between a plurality of correlation values within an arbitrary region of the high-resolution combined image generated in the high-resolution combining step; and an image correcting step for correcting the high-resolution combined image based on the correlation amount determined in the moving-object detecting step.

REFERENCE SIGNS LIST 1 imaging apparatus
2 image acquisition unit
3 image processing device
6 imaging element
9 high-resolution combining unit
10 moving-object detecting unit
11 correlation-coefficient calculating unit
12 image correcting unit
80, 81 subject
S1 high-resolution combining step
S2 moving-object detecting step
S3 correlation-coefficient calculating step
S4 image correcting step

The invention claimed is:
1. An image processing device comprising:
a processor that is configured to:
generate a high-resolution combined image by combining a standard image with at least one reference image other than the standard image in a high-resolution image space having higher resolution than the standard image or the at least one reference image, the standard image and the at least one reference image being acquired by photographing a subject in a time-series manner by using an imaging element having a plurality of types of color filters arranged for each pixel;

determine at least one correlation amount by calculating a magnitude relationship between a plurality of correlation values within an arbitrary region of the generated high-resolution combined image; and correct the high-resolution combined image based on the determined at least one correlation amount, wherein the processor determines the at least one correlation amount by calculating the magnitude relationship between the plurality of correlation values calculated between two comparison images constituted of pixels, which correspond to different types of color filters, of the generated high-resolution combined image.

2. The image processing device according to claim 1, wherein the processor is further configured to calculate a correlation coefficient from the determined at least one correlation amount, and wherein the processor is configured to combine the high-resolution combined image with the standard image in accordance with a combining ratio based on the calculated correlation coefficient so as to correct the high-resolution combined image.

3. The image processing device according to claim 1, wherein the processor is further configured to calculate a correlation coefficient from the determined at least one correlation amount, and wherein the processor is configured to combine two images obtained by applying filters having different low-pass effects to the high-resolution combined image in accordance with a combining ratio based on the calculated correlation coefficient so as to correct the high-resolution combined image.

4. The image processing device according to claim 1, wherein the correlation values include at least two correlation values selected from a correlation value calculated by using regions at identical positions of the two comparison images and a correlation value calculated by using regions at relatively-displaced positions of the two comparison images.

5. The image processing device according to claim 4, wherein the correlation value calculated by using the regions at the relatively displaced positions of the two comparison images is calculated by using regions in which the positions of the two comparison images are relatively displaced from each other by m pixels in a horizontal direction and n pixels in a vertical direction when preset high-resolution multiplying factors are m× in the horizontal direction and n× in the vertical direction.

6. An imaging apparatus comprising:
an image acquisition unit that acquires a standard image and a reference image; and
the image processing device according to claim 1 that processes the standard image and the reference image acquired by the image acquisition unit,
wherein the image acquisition unit includes the imaging element having the plurality of types of color filters arranged for each pixel.

7. An image processing method comprising:
generating a high-resolution combined image by combining a standard image with at least one reference image other than the standard image in a high-resolution image space having higher resolution than the standard image or the at least one reference image, the standard image and the at least one reference image being acquired by photographing a subject in a time-series manner by using an imaging element having a plurality of types of color filters arranged for each pixel;

determining at least one correlation amount by calculating a magnitude relationship between a plurality of correlation values within an arbitrary region of the generated high-resolution combined image; and correcting the high-resolution combined image based on the determined at least one correlation amount;

wherein the at least one correlation amount is determined by calculating the magnitude relationship between the plurality of correlation values calculated between two comparison images constituted of pixels, which correspond to different types of color filters, of the generated high-resolution combined image.

8. The image processing method according to claim 7, further comprising:
calculating a correlation coefficient from the determined at least one correlation amount,
wherein the correcting includes combining the high-resolution combined image with the standard image in accordance with a combining ratio based on the calculated correlation coefficient so as to correct the high-resolution combined image.

9. The image processing method according to claim 7, further comprising:
calculating a correlation coefficient from the determined at least one correlation amount,
wherein the correcting includes combining two images obtained by applying filters having different low-pass effects to the high-resolution combined image in accordance with a combining ratio based on the calculated correlation coefficient so as to correct the high-resolution combined image.

10. The image processing method according to claim 7, wherein the correlation values include at least two correlation values selected from a correlation value calculated by using regions at identical positions of the two comparison images and a correlation value calculated by using regions at relatively displaced positions of the two comparison images.

11. The image processing method according to claim 10, wherein the correlation value calculated by using the regions at the relatively displaced positions of the two comparison images is calculated by using regions in which the positions of the two comparison images are relatively displaced from each other by m pixels in a horizontal direction and n pixels in a vertical direction when preset high-resolution multiplying factors are m× in the horizontal direction and n× in the vertical direction.

12. A non-transitory computer readable recording medium storing an image processing program causing a computer to execute a process, the process comprising:
generating a high-resolution combined image by combining a standard image with at least one reference image other than the standard image in a high-resolution image space having higher resolution than the standard image or the at least one reference image, the standard image and the at least one reference image being acquired by photographing a subject in a time-series manner by using an imaging element having a plurality of types of color filters arranged for each pixel;

determining at least one correlation amount by calculating a magnitude relationship between a plurality of correlation values within an arbitrary region of the generated high-resolution combined image; and correcting the high-resolution combined image based on the determined at least one correlation amount,
wherein the at least one correlation amount is determined by calculating the magnitude relationship between the plurality of correlation values calculated between two comparison images constituted of pixels, which correspond to different types of color filters, of the generated high-resolution combined image.

\* \* \* \* \*